United States Patent
Stoll et al.

(10) Patent No.: US 12,174,160 B2
(45) Date of Patent: Dec. 24, 2024

(54) FLUID PROCESSING WITH WITHDRAW-TRANSFER MODULATION

(71) Applicant: Agilent Technologies, Inc., Santa Clara, CA (US)

(72) Inventors: Dwight Robert Stoll, Saint Peter, MN (US); Konstantin Shoykhet, Karlsruhe (DE); Thomas Ortmann, Straubenhardt/Ottenhausen (DE); Stephan Buckenmaier, Ettlingen (DE); Sascha Lege, Baden-Wuerttemberg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 342 days.

(21) Appl. No.: 17/631,924

(22) PCT Filed: Jul. 30, 2020

(86) PCT No.: PCT/IB2020/057215
§ 371 (c)(1),
(2) Date: Feb. 1, 2022

(87) PCT Pub. No.: WO2021/019496
PCT Pub. Date: Feb. 4, 2021

(65) Prior Publication Data
US 2022/0283129 A1 Sep. 8, 2022

Related U.S. Application Data

(60) Provisional application No. 62/881,394, filed on Aug. 1, 2019.

(51) Int. Cl.
*G01N 30/46* (2006.01)
*G01N 30/02* (2006.01)
*G01N 30/34* (2006.01)

(52) U.S. Cl.
CPC ..... *G01N 30/463* (2013.01); *G01N 2030/027* (2013.01); *G01N 30/34* (2013.01); *G01N 30/465* (2013.01)

(58) Field of Classification Search
CPC .................................................. G01N 30/463
See application file for complete search history.

(56) References Cited

U.S. PATENT DOCUMENTS 5,695,720 A * 12/1997 Wade ................. G01N 35/1097
422/62
2009/0255601 A1 10/2009 Baeuerle et al.
(Continued)

FOREIGN PATENT DOCUMENTS

| WO | 2009062538 A1 | 5/2009 |
| WO | 2010139359 A1 | 12/2010 |
| WO | 2016016740 A1 | 2/2016 |

OTHER PUBLICATIONS

U.S. Appl. No. 62/736,014, filed Sep. 25, 2018, Stoll et al.
(Continued)

*Primary Examiner* — Herbert K Roberts

(57) ABSTRACT

A fluid processing apparatus includes a first fluid processing unit and a second fluid processing unit. A fluid unit is fluidically coupled to the first fluid processing unit and includes a first buffering unit configured for buffering fluid, and/or a mask flow source configured for providing a mask fluid or a flow thereof. A first coupling point is fluidically coupled between the first fluid processing unit and the fluid unit. A modulation unit is configured, selectively, for withdrawing fluid from the first coupling point, or for transferring withdrawn fluid into the second fluid processing unit. The apparatus may be utilized for chromatography.

18 Claims, 7 Drawing Sheets

(56) References Cited

U.S. PATENT DOCUMENTS

| | | |
|---|---|---|
| 2012/0240666 A1 | 9/2012 | Sims |
| 2016/0334031 A1 | 11/2016 | Shoykhet et al. |
| 2017/0131244 A1* | 5/2017 | Witt .................... G01N 30/463 |
| 2017/0209812 A1 | 7/2017 | Dlugasch et al. |
| 2017/0343520 A1* | 11/2017 | Ortmann ................ G01N 30/04 |
| 2021/0394082 A1 | 12/2021 | Shoykhet et al. |

OTHER PUBLICATIONS

Murphy, Robert E., et al., "Effect of Sampling Rate on Resolution in Comprehensive Two-Dimensional Liquid Chromatography"; Analytical Chemistry, vol. 70, No. 8; Apr. 15, 1998; pp. 1585-1594.

PCT Notification of Transmittal of The International Search Report & Written Opinion mailed on Oct. 16, 2020 for Application No. PCT/IB2020/057215; 16 pages.

* cited by examiner

FLUID PROCESSING WITH WITHDRAW-TRANSFER MODULATION

RELATED APPLICATIONS

This application is the national stage under 35 U.S.C. 371 of International Application No. PCT/IB2020/057215, filed Jul. 30, 2020, which claims priority to U.S. Provisional Patent Application No. 62/881,394, filed Aug. 1, 2019; the entire contents of each of which are incorporated by reference herein.

TECHNICAL FIELD

The present invention relates to fluid processing in particular for chromatographic sample separation.

BACKGROUND

In liquid chromatography, a fluidic sample and an eluent (liquid mobile phase) may be pumped through conduits and a column in which separation of sample components takes place. The column may comprise a material which is capable of separating different components of the fluidic analyte. Such a packing material, so-called beads which may comprise silica gel, may be filled into a column tube which may be connected to other system elements (like a sampler, a detector) by conduits.

The composition of the mobile phase can be adjusted by composing the mobile phase from different fluidic components with variable contributions, so called gradient mode. High performance liquid chromatography ("HPLC") systems often are operated in such gradient mode, wherein for instance for reversed phase chromatography the organic content is ramped over time, or for ion exchange chromatography the salt content is ramped over time. Especially in peptide or protein analysis most applications are based on water/acetonitrile gradients. An analytical protocol for running a defined analytical process is called the "method". In the analytical protocol—or method—for a gradient separation, the gradient is usually defined as a composition change program over time, while the flow rate may be kept constant. The so-called retention time is a time required for transport of a certain component of a fluidic sample to be separated throughout a separation column during a separation run.

Two-dimensional separation of a fluidic sample denotes a separation technique in which a first separation procedure (typically in a first separation unit such as a first chromatographic column) is performed to separate a fluidic sample into a plurality of fractions, and in which a subsequent second separation procedure (typically in a second separation unit such as a second chromatographic column) is performed to further separate at least one of the plurality of fractions into sub-fractions. Two-dimensional liquid chromatography (2D LC) may combine two liquid chromatography separation techniques and plot the time dependency of detection events along two orthogonal time axes.

US2017343520A1, by the same applicant, discloses—inter alia—a two-dimensional separation apparatus having a flow adjustment unit. Separated fractions from the first dimension can be temporarily stored in the flow adjustment unit and later be injected into the second dimension.

U.S. application 62/736,014, filed on Sep. 25, 2018 by the same applicant, discloses a push-pull modulation in a so-called tandem-LC system for two-dimensional separation, wherein the second-dimension separation unit is arranged downstream of the first-dimension separation unit, and the first and second dimension are directly fluidically coupled with each other by having a direct flow from a first-dimension outlet to a second-dimension inlet.

SUMMARY

It is an object of the invention to provide an improved fluid processing, preferably for two-dimensional chromatographic sample separation.

A preferred embodiment provides a fluid processing apparatus comprising a first fluid processing unit and a second fluid processing unit, each configured for processing fluid. A fluid unit is fluidically coupled to the first fluid processing unit and comprises at least one of: a first buffering unit configured for buffering fluid, and a mask flow source configured for providing a mask fluid or a flow thereof. The first buffering unit allows buffering fluid in particular as received from the first fluid processing unit, as will be explained later in more detail. A first coupling point is fluidically coupled between the first fluid processing unit and the fluid unit. A modulation unit is configured, selectively, for withdrawing fluid from the first coupling point, or for transferring (e.g. injecting) withdrawn fluid into the second fluid processing unit. In other words, the modulation unit is configured to be operated selectively in a first position or in a second position. In the first position the modulation unit is configured for withdrawing fluid from the first coupling point. In the second position the modulation unit is configured for transferring (e.g. injecting) withdrawn fluid into the second fluid processing unit. This allows the modulation unit to withdraw fluid from either one or both of the first fluid processing unit and the first buffering unit.

The fluid unit allows modifying the fluid effluent being output from the first fluid processing unit and further being withdrawn by the modulation unit from the first coupling point by adding an additional fluid content. Such additional fluid content can be a fluid effluent having been previously output from the first fluid processing unit and buffered in the first buffering unit. Alternatively or in addition, such additional fluid content can be the mask fluid, e.g. allowing to dilute the effluent output from the first fluid processing unit by such mask fluid.

In a preferred embodiment, any fluid content (e.g. the entire effluent or a part thereof) as output from the first fluid processing unit can be either withdrawn directly from the first fluid processing unit or after having been buffered in the first buffering unit. This allows e.g. a full transfer of any sample processed in the first fluid processing unit into the second fluid processing unit (for example in the sense of a comprehensive two-dimensional fluid separation). Alternatively, only a part of the effluent (e.g. a sample aliquot) from the first fluid processing unit can thus be transferred into the second fluid processing unit.

In a preferred embodiment, the modulation unit comprises a sampling unit. The sampling unit preferably comprises a second buffering unit (e.g. comprising a sample loop or any other reservoir suitable for fluid buffering) and a modulation drive. The modulation drive is preferably configured for withdrawing (from the first coupling point) fluid into the second buffering unit and for injecting (e.g. ejecting) into the second fluid processing unit fluid having been buffered by the second buffering unit. The modulation drive may be or comprise at least one of: a syringe, a syringe pump, a pump, and a pumping unit comprising a plurality of pumps, a piston pump, preferably a reciprocating piston pump, a dual pump comprising two piston pumps connected in parallel or serial to each other, a multi-stage step-piston pump having a single piston with at least two sections of different diameters, and a modulation pump being capable of intaking and ejecting at least a limited amount of fluid via the same connection port/conduit.

In a preferred embodiment, the modulation unit comprises a modulation valve configured, in the first position, for coupling the sampling unit to the first coupling point and, in the second position, for coupling the sampling unit to the second fluid processing unit. The modulation valve may be embodied by an active switching valve, preferably a rotational or translatory valve, or a passive switching valve, preferably comprising one or more passive valve components such as check valves.

In a preferred embodiment, the modulation valve is configured, in a third position, to enable pressurizing or depressurising depressurizing (i.e. increasing or decreasing pressure of) a fluid content within the second buffering unit by acting of the modulation drive. The modulation valve may preferably fluidically block one end of the second buffering unit while the modulation drive is coupled to and acting on an opposite end of the second buffering unit (e.g. by disconnecting a part of the fluidic path comprising at least the modulation drive and the second buffering unit from any other fluidic path and blocking outbound connections of the part of the fluidic path and by acting of the modulation drive).

In a further preferred embodiment implementing the so-called feed injection type, the modulation valve, in the second position, is configured for coupling the sampling unit to a second coupling point within the second fluid processing unit in order to eject a fluid content buffered in the second buffering unit into the second fluid processing unit by combining a flow from the second buffering unit with a flow within the second fluid processing unit. The flow within the second fluid processing unit preferably is a mobile phase driven e.g. by a mobile phase drive (e.g. a pump) towards and through a chromatographic column. The feed injection fluid transfer is described also in the aforementioned US2017343520A1: a volume flow adjustment unit is configured for branching off a fluidic sample from a source flow path at a fluidic coupling point in a source flow path, and for supplying such branched off fluidic sample via another coupling point into a destination flow path. The volume flow adjustment unit described in US2017343520A1 substantially corresponds (in function and embodiments) to the modulation unit of the present application.

In an alternative preferred embodiment implementing the so-called flow-through injection type, the modulation valve, in the second position, is configured for switching a sample loop containing a fluid content, which may be the second buffering unit or a fluid content previously received from the second buffering unit, into a flow path within the second fluid processing unit in order to inject the fluid content into the second fluid processing unit. The flow-through injection type is also described in great detail in US20160334031A1 by the same applicant for transferring sample fluid in a two-dimensional chromatography application.

In a further embodiment, the mask flow source is fluidically coupling to a third coupling point. The third coupling point is preferably located between the first coupling point and the buffering unit but may also be located at the first coupling point (i.e. spatially coinciding with the first coupling point).

The mask flow source may comprise a mask flow pump configured for driving the mask fluid. Alternatively or in addition, the mask flow source may comprise a first reservoir of the mask fluid. The mask fluid may be a solvent or a solvent mixture. The mask fluid may be a chromatographically weak solvent (weak e.g. with respect to separation conditions in the second fluid processing unit, e.g. in a chromatographic column thereof) configured for slowly chromatographically eluting a sample from a chromatographic column of the second fluid processing unit (e.g. relative to a chromatographically strong solvent configured for a faster chromatographic elution of such sample through such chromatographic column). Preferably, the mask fluid is configured to be weak enough, such that, if it is added to the sample introduced into the second fluid processing unit, it does not significantly influence a retention of the sample. Further preferably, the mask fluid may be selected to be weaker than an initial gradient solvent in the second fluid processing unit.

In a further embodiment, an auxiliary fluid source is fluidically coupling to the modulation unit and being configured for providing a flow of an auxiliary fluid. The auxiliary fluid source may comprise an auxiliary pump configured for driving the mask fluid. Alternatively or in addition, the auxiliary fluid source may comprise a second reservoir of the auxiliary fluid. The auxiliary fluid may be a solvent or a solvent mixture. The auxiliary fluid may be a chromatographically weak solvent (weak e.g. with respect to separation conditions in the second fluid processing unit, e.g. in a chromatographic column thereof) configured for slowly chromatographically eluting a sample from a chromatographic column of the second fluid processing unit (e.g. relative to a chromatographically strong solvent configured for a faster chromatographic elution of such sample through such chromatographic column). Preferably, the auxiliary fluid is a weak enough solvent, such that, if it is added to the sample introduced into the second fluid processing unit, it does not significantly influence a retention of the sample. Further preferably, the auxiliary fluid may be weaker than an initial gradient solvent in the second fluid processing unit.

A preferred embodiment further comprises a pressure source coupled to the first buffering unit, preferably in order to assist fluid flow from the first buffering unit to the modulation unit. The pressure source may be embodied in any suitable way is known in the art, e.g. as an individual pressure pump or by coupling to a respective pressure pump, for example, to the mask flow source and/or the second fluid processing unit. Such assisting pressure source may allow pushing fluid from the first buffering unit, e.g. to the first coupling point and maybe beyond into the modulation unit, rather than (only) pulling such fluid from the first buffering unit e.g. by the modulation drive of the modulation unit. This may help increasing the driving force and speed of the fluid content from the first buffering unit into the second buffering unit.

In a preferred embodiment, the first fluid processing unit and the second fluid processing unit are fluidically decoupled from each other, so that a transfer of fluid from the first fluid processing unit to the second fluid processing unit can occur only via active modulation of or by the modulation unit. This ensures that both the first and second fluid processing unit are fluidically independent from each other with no passive flow but only an active fluid transfer (via the modulation unit) between the first and second fluid processing units.

In a preferred embodiment, the first fluid processing unit comprises a first flow path, and the second fluid processing unit comprises a second flow path. The first flow path and the second flow path are fluidically decoupled from each other, preferably so that there is no passive flow path connection between the first flow path and the second flow path at any time, and a transfer of fluid from the first flow path to the second flow path can occur only via active modulation by the modulation unit. This ensures that both the first and second fluid processing unit are fluidically independent from each other with no passive flow but only an active fluid transfer (via the modulation unit) between the first and second fluid processing units.

In an embodiment, the modulation unit is configured for withdrawing from the first coupling point at least such amount of fluid as received (or output) from the first fluid processing unit. When withdrawing an amount of fluid larger than what being output from the first fluid processing unit within a current withdraw time interval, additional fluid amounts can be withdrawn from the first buffering unit and/or other fluid sources coupled to the first coupling point. The term "withdraw time interval" shall mean a respective time interval in which the modulation unit is withdrawing fluid from the first coupling point.

Any excess of the withdrawn amount of fluid over the amount flown out of the first separation unit (i.e. the effluent from the first separation unit) within a respective withdraw time interval is drawn from fluid unit. If such excess of the withdrawn amount of fluid is drawn from the first buffering unit, it may contain the output (effluent) of the first separation unit preceding (e.g. immediately preceding) the output of the first separation unit during a respective withdraw time interval. Thus, a sample of volume equal to the draw volume ending at the moment of the withdrawal end and starting the draw volume earlier is drawn.

The volume of sample fluid withdrawn during a respective withdraw time interval may thus comprise (1) the effluent output by the first fluid processing unit during the withdraw time interval, and in addition to this, at least one of: (2) effluent output by the first fluid processing unit preceding the respective withdraw time interval and having been buffered in the first buffering unit, and (3) an amount of mask fluid as provided by the mask flow source.

While the end of a respective withdraw time interval determines the end of the withdrawn sample fluid (with the sample fluid portion at such end of the respective withdraw time interval being the sample fluid portion output the last from the first fluid processing unit during such withdraw time interval), the sample fluid portion withdrawn at the beginning of the respective withdraw time interval may have been output from the first fluid processing unit before the beginning of the respective withdraw time interval and may have been buffered in the first buffering unit.

In an embodiment the content of the buffering unit may be at least partly displaced with the mask fluid (e.g. a solvent) e.g. in advance of a respective withdraw operation provided by the modulation unit.

In an embodiment the mask flow source may be injecting the mask fluid into the first buffering unit up to the moment in the time, when a beginning of an envisioned sample to be withdrawn passes the third coupling point, e.g. in order to provide a defined beginning of a respective withdraw time interval.

In an embodiment an amount of fluid may be withdrawn which exceeds an envisioned sample volume by a predefined amount or predefined factor. In this case the still excessive withdrawn fluid is drawn from sections of the first buffering unit downstream of the part of the sample volume containing an amount of previously injected mask fluid. In other words, the modulation unit withdraws from the first buffering unit a fluid volume larger than any sample fluid buffered in the first buffering unit, in order to ensure that the first buffering unit is completely emptied from buffered sample fluid. By drawing this additional volume of mask fluid, the most complete transfer of the envisioned sample volume can be achieved.

In an embodiment the amount of the fluid to be withdrawn from the first buffering unit within a single withdraw time interval is selected to equal to or exceeding the amount of fluid provided as output of the first fluid processing unit within a respective time interval between two subsequent withdraw time intervals. In other words, the amount of fluid to be withdrawn from the first coupling point during a respective withdraw time interval is selected as the amount of effluent output from the first fluid processing unit after the end of the previous withdraw time interval and the end of the current withdraw time interval. In an example, with the fluid processing apparatus having a sampling cycle of one minute, i.e. the modulation unit transfers fluid into the second fluid processing unit every minute, and a respective withdraw time interval of 20 seconds (i.e. the modulation unit withdraws fluid from the first coupling point every minute for a withdraw time interval of 20 seconds), the modulation unit is configured to withdraw during these 20 seconds the amount of effluent from the first fluid processing unit provided during one minute of operation. In this mode all fluid output of the first processing unit may be transferred for analysis in the second fluid processing unit substantially lossless.

The draw speed of the modulation unit, i.e. the fluid volume over time intaken/withdrawn by the modulation unit, may be constant or variable during a respective withdraw time interval, e.g. according to the desired distribution of the actual output of effluent from the first fluid processing unit and the content of the first buffering unit along the withdrawn volume. Thus, varying the draw speed of the modulation unit can be used e.g. to control the ratio of mask fluid and effluent from the first fluid processing unit.

In an embodiment the withdrawn amount of fluid within the actual withdraw time interval is selected to be smaller than the amount of fluid output from the first fluid processing unit during the respective withdraw time interval. This operation mode can be useful for taking a representative sample over a larger section of the effluent from the first fluid processing unit.

In a preferred embodiment, each or both of the first fluid processing unit and the second fluid processing unit may comprise a respective fluid drive configured for generating a fluid flow for driving a respective fluidic sample to be separated in a respective separation unit The fluid drive is preferably driving a respective mobile phase, which may be a solvent or solvent composition and which may be varied in composition over time, with the fluidic sample to be separated being injected into such mobile phase.

In a preferred embodiment, at least one of the first coupling point, the second coupling point, and the third coupling point is configured as one of the group consisting of: a fluidic T-piece, a fluidic Y-piece, a fluidic X-piece, microfluidic junction, a group of at least 3 ports of a rotary valve, connectable together in at least one of positions of the rotary valve and a multi-entry port of a rotary valve.

Each one of the first coupling point, the second coupling point, and the third coupling point can be incorporated or located within or as part of the modulation valve (preferably implemented as a port or groove or any other part of the modulation valve) or may be fluidically coupled by any kind of fluidic conduit (e.g. a tubing or capillary, preferably as a Tee or alike junction) to a respective port of the modulation valve. In the latter case, care should be taken to avoid any sample cross contamination or other artefacts as resulting from any fluid remaining in such conduit between the respective port of the modulation valve and the respective coupling point, e.g. by adequately cleaning/flushing such conduit.

In a preferred embodiment, at least one of the first coupling point, the second coupling point, and the third coupling point comprises at least two channels joining in a rotary valve such that their joining point constitutes a port on either rotor or stator of the rotary valve, and interfacing a third channel implemented as a part of or is built in the respectively other part of the rotary valve (either stator or rotor).

In a preferred embodiment, the apparatus is a fluid separation apparatus configured for separating a fluidic sample.

In a preferred embodiment, the first fluid processing unit is a first fluid separation apparatus configured for (preferably chromatographically) separating a fluidic sample in a first dimension, wherein the first fluid separation apparatus preferably comprises a first fluid drive (e.g. a pump) configured for driving a first mobile phase, and a first chromatographic column configured for separating the fluidic sample when comprised within the first mobile phase. Other components typically used in liquid chromatography, such as a first sample introduction unit (e.g. an autosampler) for injecting the sample fluid into the mobile phase and/or a detector for detecting separated compounds of the sample fluid, may also be used.

The first fluid processing unit may also be embodied as a chemical and/or biological reactor or a part thereof. Preferably, the first fluid processing unit may be a flow line from such chemical and/or biological reactor, e.g. for monitoring such reactor. The flow line may be branched off from such reactor or a closed loop from and to such reactor.

In a preferred embodiment, the second fluid processing unit is a second fluid separation apparatus configured for (preferably chromatographically) separating a fluid sample in a second dimension, wherein the fluidic sample preferably is transferred (received) from the first separation apparatus. The second fluid separation apparatus preferably comprises a second fluid drive (e.g. a pump) configured for driving a second mobile phase, and a second chromatographic column configured for separating the fluidic sample when comprised within the second mobile phase. Other components typically used in liquid chromatography, such as a detector for detecting separated compounds of the sample fluid, may also be used.

With the first and second fluid processing units each being configured as a respective chromatographic fluid separation apparatus, a two-dimensional fluid separation can be provided with a fluid transfer from the first into the second fluid separation dimension.

In a preferred embodiment, the first coupling point is located downstream of the first fluid processing unit, preferably downstream of an outlet of the first fluid processing unit.

In a preferred embodiment, the first buffering unit is fluidically coupled to an outlet of the first fluid processing unit.

In a preferred embodiment, each or both of the first buffering unit and the second buffering unit can be configured for temporarily storing an amount of fluid, which may later be fully or partly retrieved thereof. Each or both of the first and second buffering unit may comprise at least one of a group of: one or more sample loops, one or more sample volumes, one or more trap volumes, one or more trap columns, one or more fluid reservoirs, one or more capillaries, one or more tubes (preferably bend/coiled/knitted capillaries or tubes), one or more microfluidic channel structures (preferably 2-dimensional or 3-dimensional, preferably embodied in a planar configuration as described e.g. in US20090255601A1 by the same applicant), one or more reactor volumes allowing to execute a chemical and/or biological reaction with the fluid volume buffered therein, a so-called "Parkdeck" configuration with a plurality of selectable buffering volumes as disclosed e.g. in WO2016016740A1 by the same applicant, or the like. Each or both of the first and second buffering unit can be configured/optimized for low flow resistance and low dispersion. Each or both of the first and second buffering unit can be configured/optimized for having low longitudinal mixing characteristic, so that mixing of any variation (e.g. in concentration, composition, et cetera) in the buffered fluid content along the fluid motion direction or axis substantially only occurs under the influence of diffusion. Each or both of the first and second buffering unit can be configured/optimized to at least substantially maintain a spatial variation in the sample fluid (along the flow direction of the sample), as e.g. resulting from a previous chromatographic separation of the sample fluid, during temporarily storing of such sample fluid.

In a preferred embodiment, the modulation unit is configured for withdrawing fluid from a point in the fluidic path fluidically connected with an outlet of the first fluid processing unit, which preferably is the first coupling point.

In a preferred embodiment, the modulation unit is configured for ejecting withdrawn fluid into a second coupling point within the second fluid processing unit.

In a preferred embodiment, the fluid processing apparatus comprises a control unit configured to control withdrawing fluid from the first coupling point, and to control transferring withdrawn fluid into the second fluid processing unit.

In a preferred embodiment, the control unit is configured to control an amount of fluid being withdrawn from the first buffering unit.

In a preferred embodiment, the control unit is configured to control an amount of fluid being withdrawn during a respective withdraw time interval from the first coupling point.

In a preferred embodiment, the control unit is configured to control an amount of the withdrawn fluid being transferred into the second fluid processing unit.

In a preferred embodiment, the control unit is configured to control one or more points in time for at least one of: starting and stopping the withdraw operation, for starting and stopping eject operation and for the valve switching operations.

In a preferred embodiment, the control unit is configured to control at least one of: withdraw flow rate from the fluid unit; eject flow rate into the second fluid processing unit, flow and/or pressure generated by the fluidic drive of the second fluid processing unit.

In a preferred embodiment, a method for processing fluid comprises processing fluid in a first fluid processing unit, fluidically coupling a fluid unit to the first fluid processing unit, withdrawing fluid from a first coupling point fluidically coupled between the first fluid processing unit and fluid unit, and transferring withdrawn fluid into a second fluid processing unit. The fluid unit is configured for at least one of: buffering fluid received from the first fluid processing unit in a first buffering unit, and providing a mask fluid or a flow thereof.

The method may further comprise pressurizing or depressurising depressurizing (i.e. increasing or decreasing pressure of) the withdrawn fluid before transferring withdrawn fluid into the second fluid processing unit.

In a further preferred embodiment implementing the so-called feed injection type, as described also in the aforementioned US2017343520A1, the method may comprise coupling to the second coupling point within the second fluid processing unit in order to eject a fluid content into the second fluid processing unit. The ejected fluid content may be combined with a flow within the second fluid processing unit. Alternatively, the injected fluid content may replace (partly or entirely) an amount of the flow within the second fluid processing unit over a section of the flow path of the second fluid processing unit. Such section of the flow path may preferably protrude downstream (with respect to the flow direction in the second fluid processing unit) of the second coupling point, but it may also have a segment upstream of the second coupling point. Pressure and/or flow rate in the second fluid processing unit at the second coupling point may be controlled, preferably control to be substantially constant at least during the time interval of ejecting fluid into the second coupling point.

In a further preferred embodiment implementing the so-called flow-through injection type, as described in the aforementioned US20160334031A1, the method may comprise switching a sample loop containing a fluid content into a flow path within the second fluid processing unit in order to inject the fluid content into the second fluid processing unit.

In an embodiment, the method may comprise providing a flow of a mask fluid to at least one of the first coupling point and the second coupling point in order to dilute the withdrawn fluid.

In an embodiment, the method may comprise providing a flow of a mask fluid into the first buffering unit (preferably after withdrawal of the fluid buffered into the first buffering unit e.g. by a modulation drive, more preferably after withdrawal of the fluid buffered into the first buffering unit by the modulation unit but during an ongoing draw operation of the modulation unit, i.e. in an end phase of the withdrawal; and not operating or operating in a reduced flow regime during the modulation unit is not withdrawing the fluid from the first coupling point).

In an embodiment, the flow of the mask fluid is provided before an envisioned beginning of withdrawal section, e.g. before a subsequent withdraw time interval. The flow of the mask fluid may be provided before a respective effluent from the first fluid processing unit reaches the third coupling point, thus allowing e.g. to flush the first buffering unit. The flow of the first mask fluid may then be stopped or at least reduced when the respective effluent from the first fluid processing unit reaches the third coupling point in order to buffer at least a portion of such effluent in the first buffering unit.

In an embodiment, processing fluid in the first fluid processing unit may comprise separating a fluidic sample in a first dimension.

In an embodiment, processing fluid in the second fluid processing unit may comprise separating a transferred fluid sample content in a second dimension.

In an embodiment, the first coupling point is located downstream of the first fluid processing unit, preferably downstream of an outlet of the first fluid processing unit.

In an embodiment, withdrawing fluid may comprise withdrawing a desired or calculated amount of the fluid from the first buffering unit along with the fluid supplied from (e.g. an outlet of) the first fluid processing unit via the first processing point by means of the modulation unit.

In an embodiment, withdrawing fluid may comprise withdrawing fluid from the first fluid processing unit via the first coupling point.

In an embodiment, transferring withdrawn fluid may comprise ejecting withdrawn fluid into the second fluid processing unit.

According to still another exemplary embodiment of the present invention, a software program or product (or software) is provided, preferably stored on a non-transitory medium or data carrier, for controlling or executing the method having the above-mentioned features, when run on a data processing system such as an electronic processor-based computing device or computer (or system controller, control unit, etc.) that includes one or more electronic processors and memories. For example, one embodiment of the present disclosure provides a non-transitory computer-readable medium that includes instructions stored thereon, such that when executed on a processor, the instructions perform the steps of the method of any of the embodiments disclosed herein.

The term "aliquot" or "sample aliquot" as used herein can be understood as a portion of a fluid (e.g. a fluidic sample), preferably a portion of an effluent of a first dimension, which is (or will be) subjected as a whole (i.e. preferably comprising its entire volume) to separation (typically in a second dimension) into one or more fractions thereof.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.) or finer separated by the first separation criterion, thereby splitting up or separating a separate fraction into a plurality of sub-fractions.

In the context of this application, the term "fraction" may particularly denote such a group of molecules or particles of a fluidic sample which have a certain property (such as mass, charge, volume, chemical properties or interaction, etc.) in common according to which the separation has been carried out. However, molecules or particles relating to one fraction can still have some degree of heterogeneity, i.e. can be further separated in accordance with another separation criterion. As well the term "fraction" may denote a portion of a solvent containing the aforementioned group of molecules.

In the context of this application, the term "sub-fractions" may particularly denote individual groups of molecules or particles all relating to a certain fraction which still differ from one another regarding a certain property (such as mass, volume, chemical properties, etc.). Hence, applying another separation criterion for the second separation as compared to the separation criterion for the first separation allows these groups to be further separated from one another by applying the other separation criterion, thereby obtaining the further separated sub-fractions. As well the term "sub-fraction" may denote a portion of a solvent containing the aforementioned individual group of molecules.

In the context of this application, the term "downstream" may particularly denote that a fluidic member located downstream compared to another fluidic member will only be brought in interaction with a fluidic sample after interaction with the other fluidic member (hence being arranged upstream). Therefore, the terms "downstream" and "upstream" relate to a flowing direction of the fluidic sample. The terms "downstream" and "upstream" may also relate to a preferred direction of the fluid flow between the two members being in downstream-upstream relation.

In the context of this application, the term "sample separation apparatus" may particularly denote any apparatus which is capable of separating different fractions of a fluidic sample by applying a certain separation technique. Particularly, two separation apparatus may be provided in such a sample separation apparatus when being configured for a two-dimensional separation. This means that the sample is first separated in accordance with a first separation criterion, and at least one or some of the fractions resulting from the first separation are subsequently separated in accordance with a second, different, separation criterion ore more finely separated in accordance with the first separation criterion.

The term "separation unit" may particularly denote a fluidic member through which a fluidic sample is transferred, and which is configured so that, upon conducting the fluidic sample through the separation unit, the fluidic sample will be separated into different groups of molecules or particles (called fractions or sub-fractions, respectively). An example for a separation unit is a liquid chromatography column which is capable of trapping or retarding and selectively releasing different fractions of the fluidic sample.

In the context of this application, the term "fluid drive" may particularly denote any kind of pump which is configured for forcing a flow of mobile phase and/or a fluidic sample along a fluidic path. A corresponding liquid supply system may be configured for delivery of a single liquid or of two or more liquids in controlled proportions and for supplying a resultant mixture as a mobile phase. It is possible to provide a plurality of solvent supply lines, each fluidically connected with a respective reservoir containing a respective liquid, a proportioning valve interposed between the solvent supply lines and the inlet of the fluid drive, the proportioning valve configured for modulating solvent composition by sequentially coupling selected ones of the solvent supply lines with the inlet of the fluid drive, wherein the fluid drive is configured for taking in liquids from the selected solvent supply lines and for supplying a mixture of the liquids at its outlet. More particularly, the first fluid drive can be configured to drive the fluidic sample, usually mixed with, or injected into a flow of a mobile phase (solvent composition), through the first-dimension separation apparatus, whereas the second fluid drive can be configured for driving the fluidic sample fractions, usually mixed with a further mobile phase (solvent composition), after treatment by the first-dimension separation unit through the second-dimension separation apparatus.

In the context of this application, the term "flow coupler" or "coupling point" may particularly denote a fluidic component which is capable of unifying flow components from two fluid inlet terminals into one common fluid outlet terminal. For example, a bifurcated flow path may be provided in which two streams of fluids flow towards a bifurcation point are unified to flow together through the fluid outlet terminal. At a bifurcation point where the fluid inlet terminals and the fluid outlet terminal are fluidically connected, fluid may flow from any source terminal to any destination terminal depending on actual pressure conditions. The flow coupler may act as a flow combiner for combining flow streams from the two fluid inlet terminals further flowing to the fluid outlet terminal. The flow coupler may provide for a permanent (or for a selective) fluid communication between the respective fluid terminals and connected conduits, thereby allowing for a pressure equilibration between these conduits. In certain embodiments, the flow coupler may also act as a flow splitter.

In the context of this application, the term "valve" or "fluidic valve" may particularly denote a fluidic component which has fluidic interfaces, wherein upon switching the fluidic valve selective ones of the fluidic interfaces may be selectively coupled to one another so as to allow fluid to flow along a corresponding fluidic path, or may be decoupled from one another, thereby disabling fluid communication.

In the context of this application, the term "buffer" or "buffering" may particularly be understood as temporarily storing. Accordingly, the term "buffering fluid" is preferably understood as temporarily storing an amount of fluid, which may later be fully or partly retrieved from such unit buffering the fluid.

In the context of this application, the term "loop" may particularly be understood as a fluid conduit allowing to temporarily store an amount of fluid, which may later be fully or partly retrieved from the loop. Preferably, such loop has an elongation along the flow direction of the fluid and a limited mixing characteristic (e.g. resulting from diffusion), so that a spatial variation in composition in the fluid will be at least substantially maintained along the elongation of the loop. Accordingly, the term "sample loop" may be understood as a loop configured to temporarily store an amount of sample fluid. Further accordingly, a sample loop is preferably configured to at least substantially maintain a spatial variation in the sample fluid (along the flow direction of the sample), as e.g. resulting from a previous chromatographic separation of the sample fluid, during temporarily storing of such sample fluid.

In the context of this application, the term "couple", "coupled", or "fluidically coupled" may particularly be understood as providing a fluidic connection at least during a desired time interval. Such fluidic connection may not be permanent but allows an essentially unconstrained flow of fluid in at least one direction (e.g. a passive transport of fluid between the components fluidically coupled to each other) at least during such desired time interval. Accordingly, fluidically coupling may involve active and/or passive components, such as one or more fluid conduits, switching elements (such as valves), active switching valves or elements thereof, check valves, et cetera.

In an embodiment, the first fluid processing unit is implemented as a first-dimension separation apparatus, and the second fluid processing unit is implemented as a second-dimension separation apparatus. The first-dimension separation apparatus and the second-dimension separation apparatus are preferably configured so as to execute the respective sample separation in accordance with different separation criteria, particularly in accordance with at least partially orthogonal separation criteria. In this context, the term "orthogonal" may particularly denote the low degree or even lack of correlation between the retention parameters in the first and the second dimension in general or at least for the expected sample components. Exemplary embodiments of the invention make benefit of this cognition and propose to adjust the parameters under a consideration of the fact that the separation criteria of the first and second fluid processing units (e.g. first dimension and second-dimension separation units) are not necessarily completely independent from one another.

The sample separation unit (of either the first dimension, the second dimension, or both) may be a chromatographic column for separating components of the fluidic sample.

Therefore, exemplary embodiments may be particularly implemented in the context of a liquid chromatography apparatus.

The sample separation apparatus may be configured to drive the mobile phase through the system by means of a high pressure, particularly of at least 400 bar, more particularly of at least 1000 bar.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs. The illustration in the drawings is schematic.

DETAILED DESCRIPTION

According to an exemplary embodiment of the invention, a two-dimensional liquid chromatography (2D-LC) system is provided for precise and reliable two-dimensional separations.

Figure 1:
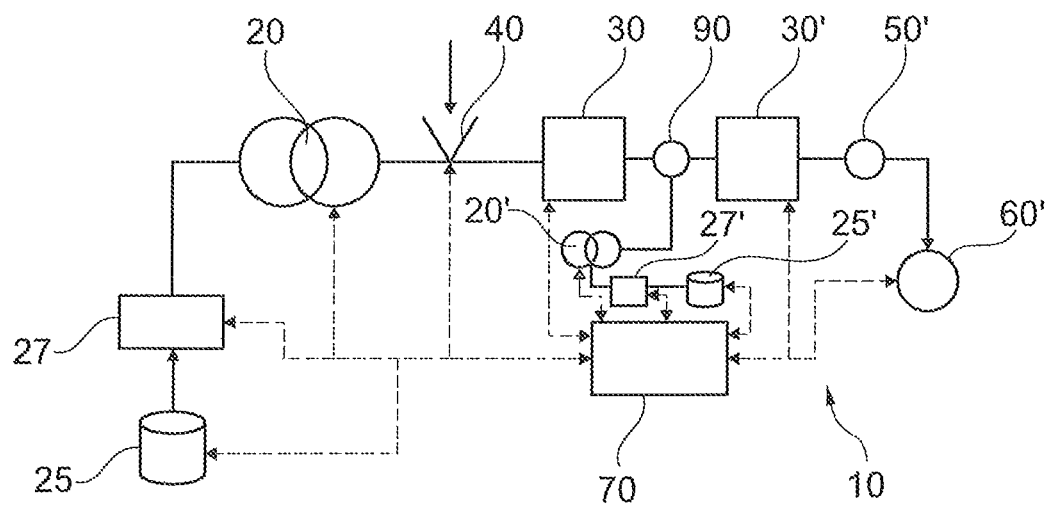
FIG. 1 illustrates a liquid chromatography system according to an exemplary embodiment.

Referring now in greater detail to the drawings, FIG. 1 depicts a general schematic of a two-dimensional liquid separation system 10. A first pump 20 receives a mobile phase (also denoted as fluid) as a whole or as individual components that get mixed together by the first pump 20, from a first solvent supply 25, typically via a first degasser 27, which degases and thus reduces the amount of dissolved gases in the mobile phase. The first pump 20—as a mobile phase drive-drives the mobile phase through a first separating device 30 (such as a chromatographic column) comprising a stationary phase. A sampling unit 40 can be provided between the first pump 20 and the first separating device 30 in order to subject or add (often referred to as sample introduction or injection) a sample fluid (also denoted as fluidic sample) into the mobile phase. The stationary phase of the first separating device 30 is configured for separating compounds of the sample liquid. Not shown in FIG. 1 (but in FIG. 2) is an optional detector 50 coupled between the first separating device 30 and a modulation assembly 90, which is provided for detecting compounds of the sample fluid separated by the first separating device 30. An optional fractionating unit 60 (not shown in the Figures) may be provided downstream from the first separating device and/or the detector 50 for collecting separated compounds of sample fluid.

A second pump 20' receives another mobile phase (also denoted as fluid) from a second solvent supply 25', typically via a second degasser 27', which degases and thus reduces the amount of dissolved gases in the other mobile phase. By the modulation assembly 90, the first dimension (reference numerals 20, 30, . . . ) of the two-dimensional liquid chromatography system 10 of FIG. 1 may be fluidically coupled to the second dimension (reference numerals 20', 30', . . . ). The fluidic sample is separated into multiple fractions by the first dimension, and each fraction is further separated into multiple sub-fractions by the second dimension.

A detector 50' is provided for detecting separated compounds of the sample fluid. A fractionating unit 60' can be provided for collecting separated compounds of sample fluid.

While each of the mobile phases can be comprised of one solvent only, it may also be mixed from plural solvents. Such mixing might be a low pressure mixing and provided upstream of the pumps 20, 20', so that the respective pump 20, 20' already receives and pumps the mixed solvents as the mobile phase. Alternatively, each pump 20, 20' might be comprised of plural individual pumping units, with plural of the pumping units each receiving and pumping a different solvent or mixture, so that the mixing of the mobile phase (as received by the respective separating device 30, 30') occurs at high pressure and downstream of the pump 20, 20' (or as part thereof). Alternatively, the pumps 20, 20' may internally mix or proportionate multiple solvents and then pump the mixture into the system. The composition of the mobile phase may be kept constant over time, the so-called isocratic mode, or varied over time, the so-called gradient mode.

A data processing unit 70, which can be a conventional PC or workstation, might be coupled (as indicated by the dotted arrows) to one or more of the devices in the liquid separation system 10 in order to receive information and/or control operation. For example, the data processing unit 70 might control operation of the pump 20, 20' (for instance setting control parameters) and receive therefrom information regarding the actual working conditions (such as output pressure, flow rate, etc.). The data processing unit 70 might also control operation of the solvent supply 25, 25' (for instance setting the solvent/s or solvent mixture to be supplied) and/or the degasser 27, 27' (for instance setting control parameters such as vacuum level) and might receive therefrom information regarding the actual working conditions (such as solvent composition supplied over time, flow rate, vacuum level, etc.). The data processing unit 70 might further control operation of the sampling unit 40 (for instance controlling sample injection or synchronizing sample injection with operating conditions of the pump 20). The respective separating device 30, 30' might also be controlled by the data processing unit 70 (for instance selecting a specific flow path or column, setting operation temperature, etc.), and send— in return— information (for instance operating conditions) to the data processing unit 70. Accordingly, the detector 50 might be controlled by the data processing unit 70 (for instance with respect to spectral or wavelength settings, setting time constants, start/stop data acquisition), and send information (for instance about the detected sample compounds) to the data processing unit 70. The data processing unit 70 might also control operation of the fractionating unit 60 (for instance in conjunction with data received from the detector 50) and provides data back.

In both sample separation dimensions (first dimension: pump 20, separating device 30; second dimension: pump 20', separating device 30') of the 2D-LC system shown in FIG. 1, operation may be performed in accordance with a volume-based control scheme, e.g. as outlined in the aforementioned WO2009062538A1, rather than by a time-based control scheme. Hence, the separation of the fractions and sub-fractions of the fluidic sample is performed in terms of delivered or run volumes rather than in terms of time slices.

Figure 2A:
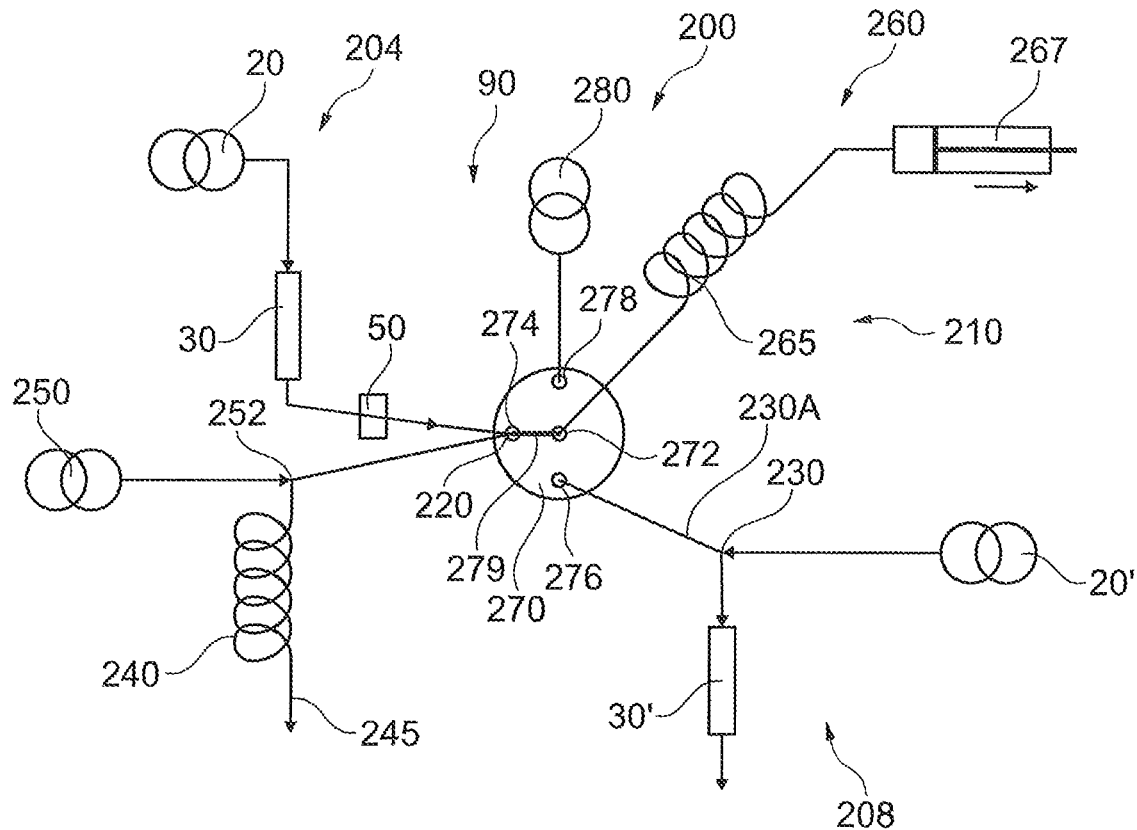
FIG. 2A is a schematic view of an example of a fluid processing apparatus according to an exemplary embodiment, with a modulation unit thereof in a first position.
Figure 2B:
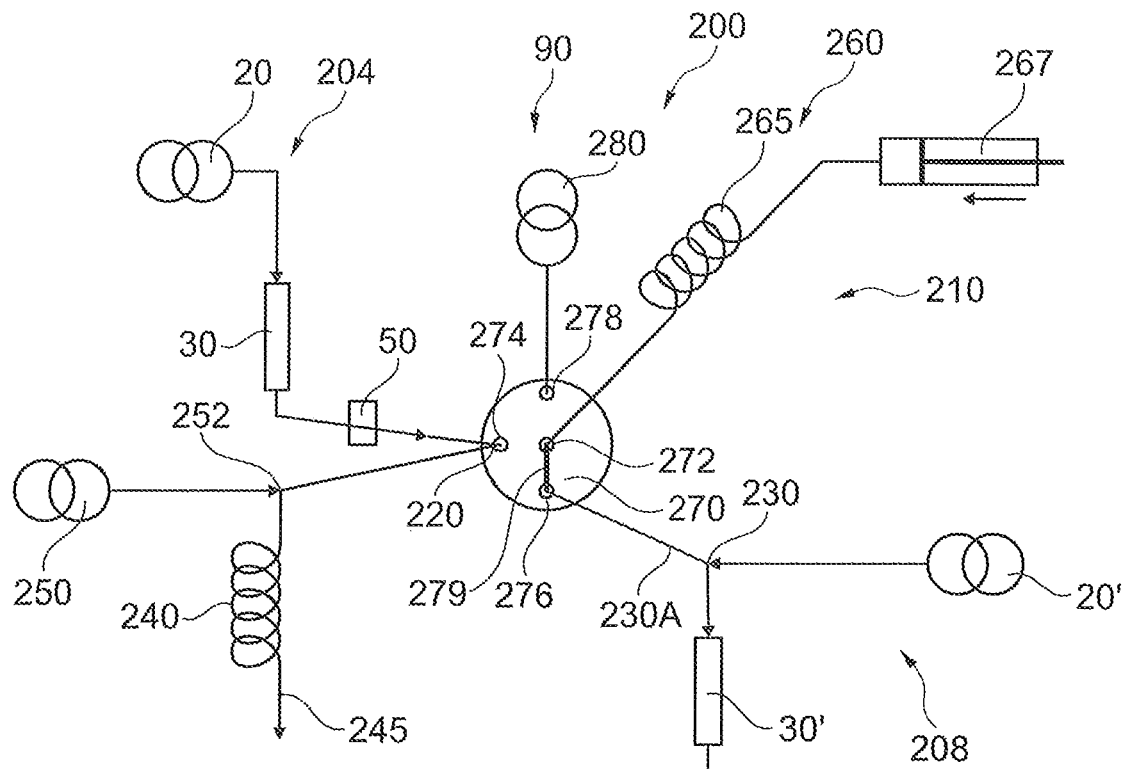
FIG. 2B is a schematic view of the fluid processing apparatus illustrated in FIG. 2A, with the modulation unit in a second position.
Figure 2C:
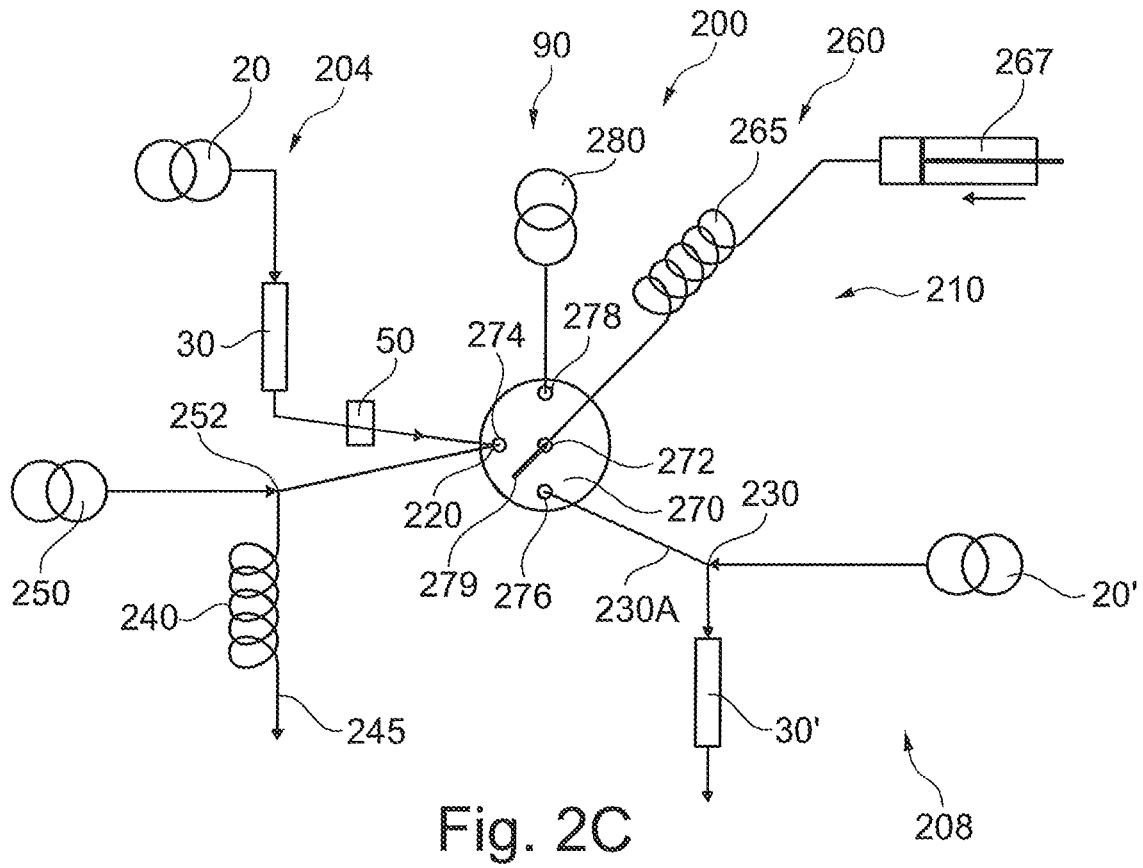
FIG. 2C is a schematic view of the fluid processing apparatus illustrated in FIG. 2A, with the modulation unit in a third position.

The way of operation of the modulation assembly 90 together with a way of arranging the fluidic paths fluidically coupling the two dimensions and implementing the sample modulation shall be explained in more detail with respect to FIGS. 2A-C depicting a preferred embodiment of a fluid processing apparatus 200. In the fluid processing apparatus 200 shown in FIGS. 2A-C, only the features required for explanation are illustrated for the sake of simplicity. It is to be understood, however, that additional features, as e.g. shown in FIG. 1, may be included accordingly.

In FIGS. 2A-C, the fluid processing apparatus 200 is embodied as a sample separation apparatus capable of separating a fluidic sample, which is injected (e.g. by the sample injector 40 as shown in FIG. 1) into a mobile phase, first into a plurality of fractions (each representing a group of molecules) by a first-dimension separation apparatus (or first fluid processing unit) 204 (which comprises a first pumping unit 20 and a first, or first-dimension, chromatographic column 30). Later, each of these fractions may be further separated into a plurality of sub-fractions by a second-dimension separation apparatus (or second fluid processing unit) 208. Such separation in the second dimension can be performed when all (preferably in multiple portions, as e.g. in a so-called comprehensive mode) or at least some of (in a single portion or in multiple portions, as e.g. in a so-called heart-cutting mode) of the effluent of the first separation apparatus 204 is transferred via a modulation unit 210 from a first coupling point 220 (located downstream of the first-dimension column 30) to a second coupling point 230 within the second fluid processing unit 208. Accordingly, the modulation unit 210 in FIG. 2 corresponds in function with the modulation assembly 90 of FIG. 1.

One or more of the fractions (of the effluent from the first separation apparatus 204) can further be split into a plurality of sub-sections by the second, or second-dimension, chromatographic column 30'. For that purpose, the second-dimension chromatographic column 30' may be configured so as to have another separation criterion as compared to the first-dimension chromatographic column 30. This may for instance be achieved by e.g. different stationary phases, different solvent composition, different pH values of the solvent in first and second dimension, and/or different temperature, used in the two separation systems.

In the example of FIG. 2, the two-dimensional liquid chromatography apparatus 200 comprises a first binary pump 20. The first binary pump 20 is configured for conducting (in particular driving) the fluidic sample to be separated through the first-dimension chromatographic column 30. For this purpose, the first binary pump 20 provides e.g. a mixture of a first solvent (such as water) and a second solvent (such as acetonitrile, ACN). The first binary pump 20 mixes these two solvents to form a mobile phase composition which is pumped through the column 30. By means of the sample injector 40 (not shown in FIG. 2), the actual fluidic sample is added to (also referred to as "injected into") the mobile phase, so the fluidic sample and the mobile phase are then transported towards the first-dimension chromatographic column 30.

In the first-dimension chromatographic column 30, the different fractions of the fluidic sample are retained at the separating material of the column 30 and are later individually released from the column 30, e.g., during a gradient run. Therefore, at the first coupling point 220, the various fractions of the sample are already separated to a certain extent. The detector 50 may be optionally provided e.g. between the column 30 and the first coupling point 220.

A first buffering unit 240 is located downstream to the first-dimension column 30. The first buffering unit 240 is fluidically coupling on one end to the first fluid processing unit 204 and allows buffering fluid (e.g. fluid received from the first-dimension column 30). The other end of the first buffering unit 240 may be coupling to a waste port, one or more (further) buffering units (each being preferably configured for storing/buffering a respective sample content), a further processing unit, a pressure or fluid flow source (preferably for driving fluid content out of the buffering unit 240 e.g. towards the modulation unit 210, or the like, which shall be generally represented by a fluidic point 245.

The first coupling point 220 is fluidically coupled between the first fluid processing unit 204 and the first buffering unit 240.

As will be explained in more detail later, the modulation unit 210 is configured, selectively, for withdrawing fluid from the first coupling point 220, and for transferring withdrawn fluid into the second fluid processing unit 208. Preferably, the modulation unit 210 is configured for withdrawing from the first coupling point 220 at least such amount of fluid as received from the first fluid processing unit 204 (i.e. as eluted from the first-dimension column 30), e.g. to enable a comprehensive mode separation for transferring the entire effluent from the first-dimension into the second dimension. However, it is clear that the amount of fluid withdrawn from the first coupling point 220 together with the timing of such withdrawal activity depends on the actual application, e.g. a heart-cutting operation for example requires transferring only one or several individual portions of the first-dimension effluent at certain points in the course of the separation in the first dimension into the second dimension.

In the embodiment of FIGS. 2, a mask flow source 250 is further fluidically coupling to a third coupling point 252 and configured for providing a flow of a mask fluid, such as a solvent or a solvent mixture. The third coupling point 252 is preferably located at the first coupling point 220 (i.e. spatially coinciding with the first coupling point 220) or between the first coupling point 220 and the first buffering unit 240.

The mask fluid is preferably selected to be a chromatographically weak solvent for slowly chromatographically eluting a sample from a chromatographic column. As not further detailed in FIG. 2, the mask flow source 250 may comprise a mask flow pump (configured for driving the mask fluid) and/or a mask fluid source, which may comprise a reservoir containing the mask fluid.

In the embodiment of FIG. 2, the modulation unit 210 comprises a sampling unit 260 comprising a second buffering unit 265 and a modulation drive 267. The modulation drive 267 is configured for withdrawing fluid into the second buffering unit 265 and for (later) ejecting such fluid buffered in the second buffering unit 265.

The modulation unit 210 may comprise a modulation valve 270 configured, in a first position ("withdrawal") as shown in FIG. 2A, for coupling the sampling unit 260 to the first coupling point 220 and, in a second position ("inject") as shown in FIG. 2B, for coupling the sampling unit 260 via the second coupling point 230 to the second fluid processing unit 208.

Each of first buffering unit 240 and the second buffering unit 265 may comprise or be embodied for example by a sample loop, a sample volume, a trap volume, a trap column, a fluid reservoir, a capillary, a tube, a microfluidic channel structure, or any other flow-through fluid container, preferably optimized for minimized longitudinal dispersion, a chemical and/or biological reactor, etc. as known in the art.

Each buffering unit 240 and 265, or more precisely the content thereof, can comprise or be exposed to an agent, invoking or inducing chemical transformations in at least one of the analytes or fluid components buffered therein. Such agent can be one of: radiation in the IR, visible, UV, X-ray, Gamma, Microwave or radio wave range; alpha or beta radiation, heat, electric field, immobilized inorganic catalysts, immobilized organic catalysts or immobilized enzymes, dispersed or dissolved chemical agents. Such chemical agent may be comprised in a fluid provided by a fluidic source, preferably in particular by the mask flow source 250. Once such chemical agent is provided by the mask flow source 250, it can be drawn into the second buffering loop 265 simultaneously and in parallel with the effluent from the separation unit 30 via the first coupling point 220. Thus a dissolved or dispersed chemical agent can be added to a sampled aliquot homogeneously and in controlled way.

In the exemplary embodiment of FIGS. 2, the first coupling point 220 is located within the modulation valve 270, i.e. the first coupling point 220 is embodied as a port of the modulation valve 270, while the second coupling point 230 is coupled via a further conduit 230A to a respective port of the modulation valve 270. However, it is clear that each of the first coupling point 220, the second coupling point 230, and the third coupling point 252 can be either incorporated directly within or as part of the modulation valve 270 (preferably as a respective port, e.g. situated in a stator or rotor of the modulation valve 270), or can be fluidically coupled by any kind of fluidic conduit (e.g. a tubing or capillary, preferably as a Tee or like junction) to a respective port of the modulation valve 270. In the latter case, sample cross contamination or other artifacts may result from any fluid remaining in such conduit between the respective port of the modulation valve 270 and the respective coupling point 220, 230 and 240, and are preferably to be avoided or reduced, e.g. by providing adequate flushing.

FIG. 2C depicts a third position ("pressuring") of the modulation valve 270 to enable pressurizing or depressurizing a fluid content within the second buffering unit 265 by action of the modulation drive 267. In this embodiment, the modulation valve 270 fluidically blocks one end of the second buffering unit 265 while the modulation drive 267 is coupled to and acts on an opposite end of the second buffering unit 265, thus increasing or decreasing pressure within the second buffering unit 265. When the modulation drive 267 is operated in the direction of the arrow (in FIG. 2C), the pressure of the fluid content in the sampling unit 260 can be increased and may thus be adjusted e.g. to a pressure level present at the second coupling point 230, in particular before switching the modulation valve 270 to the second position "inject", so that the pressure conditions in the second buffering unit 265 and at the second coupling point 230 substantially correspond or match with each other, at least within a given pressure range and a certain point in the time, prior to establishing the fluidic connection.

When operating the modulation drive 267 in the direction opposite to the arrow shown in FIG. 2C, the pressure of the fluid content in the sampling unit 260 can be decreased and may thus be adjusted e.g. to a pressure level present at the first coupling point 220, in particular before switching the modulation valve 270 into the first position "withdrawal", so that the pressure conditions in the second buffering unit 265 and at the first coupling point 220 substantially correspond or match with each other, at least within a given pressure range and a certain point in the time, prior to establishing the fluidic connection.

Further in the embodiments of FIG. 2, an optional auxiliary fluid source 280 is fluidically coupling to the modulation valve 270 of the modulation unit 210 and is configured for providing-similar to the flow of the mask fluid-a flow of an auxiliary fluid, such as a solvent or a solvent mixture. The auxiliary fluid is (similar to the mask fluid) preferably selected to be a chromatographically weak solvent for slowly chromatographically eluting a sample from a chromatographic column. As not further detailed in FIGS. 2, the auxiliary fluid source 280 may comprise an auxiliary pump configured for driving the auxiliary fluid and/or a second reservoir of the auxiliary fluid. The fluidic coupling of the auxiliary fluid source 280 in FIG. 2 depends on the actual application and is only schematically depicted (for the sake of simplicity) but need not to be further detailed here. In the schematics of FIGS. 2, the modulation unit 210 may be fluidically coupled to auxiliary fluid source 280.

It is possible to implement further switching functions related to sample treatment phases by the modulating unit 210 in the valve 270, such as providing and controlling additional fluidic connection to the modulation drive 267, particularly allowing for intake of or ejection of additional amount of fluid into the modulation drive 267 via the or preferably bypassing the second buffering unit 265. Such switching functions may be capable of connecting the modulation drive 267 to at least one of: an additional fluid drive 280 (no auxiliary flow pump), a fluid source (not shown) or waste reservoir.

As will be apparent from the more detailed description of operation, as below, both the mask flow source 250 and the auxiliary fluid source 280 can be optional to provide a fluid masking (e.g. displacement or dilution) as may be required or useful in a specific application.

In the exemplary valve representation of FIGS. 2, the modulation valve 270 is a rotational valve and comprises a stator having a central port 272 (to which the sampling unit 260 is coupled), a first peripheral port 274 (which represents the first coupling point 220—as in the shown embodiment—or is fluidically coupling thereto), a second peripheral port 276 (which represents the second coupling point 230 or is fluidically coupled thereto—as in the shown embodiment), and optionally a third peripheral port 278 (to which the auxiliary fluid source 280 is coupled). A rotor of the rotational valve comprises a groove 279 coupling between the central port 272 and selectively with any one of the peripheral ports 274, 276, and 278. It is clear that the valve representation in FIG. 2 is only schematic and exemplary and that many variations and configurations are possible and readily available to the skilled person. Also, it is clear that any other valve type (such as a translatory valve or a plurality of solenoid valves, needle valves, microfluidic valves etc. as known in the art) can be applied accordingly.

In the embodiments depicted in FIG. 2, it is apparent that the first fluid processing unit 204 and the second fluid processing unit 208 are fluidically decoupled from each other. Any transfer of fluid (from the first fluid processing unit 204 to the second fluid processing unit 208) can occur only via (active) modulation by the modulation unit 210, as illustrated in the respective drawings of FIGS. 2A-2B. In other words, the first fluid processing unit 204 comprises a first flow path between the first pumping unit 20 and the fluidic point (e.g. a waste port) 245, including (in FIG. 2) the first-dimension column 30, the optional detector 50, the first coupling point 220, and the first buffering unit 240. The second fluid processing unit 208 comprises a second flow path between the second pumping unit 20' and the second-dimension chromatographic column 30' (including the second coupling point 230). The first flow path and the second flow path are fluidically decoupled from each other, so that there is no passive flow path connection between the first flow path and the second flow path at any time, and a transfer of fluid from the first flow path to the second flow path can occur only via active modulation by the modulation unit 210.

Each of the first and second coupling points 210 and 230 may be embodied as a fluidic T-piece, a fluidic Y-piece, a fluidic X-piece, or similar, as well known in the art.

Operation of the fluid processing apparatus 200 as exemplarily depicted in the FIGS. 2A-2C shall now be explained. The fluid processing apparatus 200 enables a flexible sampling with arbitrary sampling coverage up to full comprehensive mode, i.e., all or substantially all sample fluid as introduced by sample injector 40 into the (first-dimension) first fluid processing unit 204 is transferred to and can be further processed by the (second-dimension) second fluid processing unit 208.

In all of the FIGS. 2A-2C, the (first-dimension) pumping unit 20 drives the mobile phase containing the sample fluid through the (first-dimension) column 30, and the effluent thereof streams to the first coupling point 220. Any amount of such effluent from the first fluid processing unit 204, which is not removed by the sampling unit 260 from the first coupling point 220, will be streamed to the first buffering unit 240 and can be buffered therein.

As a starting condition, e.g. before an operation of the first fluid processing unit 204, the first buffering unit 240 is preferably filled with a solvent such as the mask flow provided by the mask flow source 250. In the embodiment of FIGS. 2, any effluent from the first fluid processing unit 204 which exceeds the buffering capacity of the first buffering unit 240 will leave the first buffering unit 240 towards the fluidic point 245 (e.g. waste or any other unit coupled thereto) and may become lost (in the sense that such effluent may not be transferable to the second fluid processing unit 208). It is clear that the buffering capacity of the first buffering unit 240 as well as the timing of operation can/will be selected/adjusted appropriately, e.g. dependent on the specifics of a respective application.

In the first position of the modulation valve 270, as depicted in FIG. 2A, the modulation drive 267 draws (as indicated by the direction of the arrow next to the modulation drive 267) a sampling flow from the first coupling point 220 towards and into the second buffering unit 265 for buffering a predetermined amount of such drawn-in sampling flow into the second buffering unit 265.

In an embodiment, the sampling flow is preferably selected to be higher (and more preferably to be significantly higher) than the flow of effluent from the first fluid processing unit 204 to the first coupling point 220, so that the modulation unit 210 draws/pulls an amount of fluid from the first coupling point 220 consisting of (a) the entire effluent from the first fluid processing unit 204 as provided during the drawing operation, and (b) a calculated amount of buffered fluid contained in the first buffering unit 240. Such calculated amount may be selected as the entire amount of effluent (from the first fluid processing unit 204) as (currently) buffered in the first buffering unit 240, e.g. in case of comprehensive operation, or any fraction thereof. The exact content of the buffering unit 240 will be explained further. Thus, the modulation drive 267 can draw a non-disrupted amount of effluent from the first fluid processing unit 204 and the first buffering unit 240, i.e. an amount of fluid that was output from the first fluid processing unit 204 in consecutive order without excisions, and such non-disrupted amount of effluent from the first fluid processing unit 204 can be buffered within the second buffering unit 265. Optionally, an additional amount of fluid (c) of mask flow may be drawn by the modulation unit 210 from the mask flow source 250 and/or from the first buffering unit 240. In this case, sample may be stored in a non-disruptive (but not necessarily consecutive) manner within the second buffering unit 265.

Controlling operation (in particular of the modulation drive 267) so that preferably the entire amount of effluent from the first fluid processing unit 204 buffered in the first buffering unit 240 is drawn into the modulation unit 210 thus allows to ensure that all effluent (from the first fluid processing unit 204) can be transferred into the second fluid processing unit 208 (and may not be lost, e.g. going into the fluidic point 245, e.g. waste). This also avoids any sample cross contamination resulting e.g. from a disruption of transferring sample in a consecutive order of the effluent from the first fluid processing unit 204 into the second fluid processing unit 208.

Once the calculated amount (of the buffered fluid contained in the first buffering unit 240) has been drawn from the first buffering unit 240 into the modulation unit 210 by the sampling unit 260, a draw speed (i.e. flow rate) as provided by the modulation drive 267 can be reduced e.g. down to slightly higher than a flow rate of the effluent from the first fluid processing unit 204. Alternatively, the draw speed can be calculated and kept constant during the entire draw operation, providing the intake of the desired volume of the fluid within the desired draw time.

The mask flow source 250 may deliver the mask flow which is preferably selected to be chromatographically inert, preferably a (chromatographically) weak solvent. The mask flow is preferably switched off or only at a very low flow rate during withdrawal of the calculated amount (of buffered fluid contained in the first buffering unit 240). Before the draw operation and/or afterwards, the flow rate of the mask flow may be increased in order to (a) purge the first buffering unit 240 and/or (b) compensate for an additional volume drawn by the modulation unit 210 in excess over the effluent volume provided by the first fluid processing unit 204 including the effluent volume previously buffered in the buffering unit 240. In other words, especially in case of full comprehensive operation, the modulation unit 210 may in portions draw all the effluent provided by the first fluid processing unit 204, and preferably an additional amount of fluid on top of that.

The "average flow direction" between the third coupling point 252 and the first coupling point 220 will typically be in the direction towards the first coupling point 220. In other words, the averaged fluid mass transport will typically be from the third coupling point 252 towards the first coupling point 220, as supported by the mask flow pump 250. Thus, in order to keep the first buffering unit 240 filled with fluid and avoid e.g. drawing air, the mask flow pump 250 can, by providing the mask flow, "refill" the buffering unit 240. The draw speed can be calculated and kept constant during the entire draw operation, providing the intake of the desired volume of the fluid within the desired draw time.

During operation of the modulation unit 210 and/or sampling unit 260 as illustrated in FIG. 2A, the second fluid processing unit 208 may run a chromatographic separation process e.g. with sample fluid previously transferred from the first fluid processing unit 204.

Once withdrawal of fluid effluent from the first fluid processing unit 204 has been accomplished during the first position "withdrawal", e.g. in accordance with the explanations related to FIG. 2A, and optionally after a step of compression as explained above with respect to FIG. 2C may have been executed in order to match the pressure conditions in the second buffering unit 265 with the pressure conditions at the second coupling point 230, the modulation valve 270 can be switched into the second position "inject" as illustrated in FIG. 2B. In the second position, the modulation valve 270 fluidically couples the sampling unit 260 to the second coupling point 230 (located in the connection of the second-dimension pumping unit 20' to the second-dimension column 30' of the second fluid processing unit 208) and coupling the sampling unit 260 via the valve 270 thereto. In more detail, the modulation valve 270 couples the groove 279 between the central port 272 and the second peripheral port 276.

In the embodiments of FIG. 2, the sampling unit 260 is not directly coupling to the second coupling point 230 but via a conduit 230A. However, it is clear that the conduit 230A may also be omitted and the second coupling point 230 be integrated directly into the sampling unit 260. As an example, the second coupling point 230 may be embodied e.g. as the second peripheral port 276 and/or a (not shown) groove of the valve 270.

Further in the explanation with respect to FIG. 2B, the second buffering unit 265 contains (after a previous "withdrawal" execution in the first position as depicted in FIG. 2A) a sample fluid amount from the effluent of the first fluid processing unit 204, and may further contain e.g. a volume of the mask fluid as well as still another fluid, contained in the modulation drive 267. By controlling operation in particular of the modulation drive 267, the first-dimension pumping unit 20, and the mask flow source 250, the second buffering unit 265 may contain "individual packets" comprised of sample fluid (i.e. effluent from the first fluid processing unit 204) and the mask fluid, which packets may become injected into the second fluid processing unit 208. While each "individual packet" may be individually (and one after the other) injected into the second fluid processing unit 208 as a respective injection event, it is clear that— dependent on the respective application— more than one individual packet may be injected during one respective injection event. An injection event may for example represent a process for introducing ("injecting") a certain volume of sample fluid (i.e. a portion of the effluent from the first fluid processing unit 204) into the second fluid processing unit 208 for executing a chromatographic separation of such introduced volume of sample fluid.

The embodiment of FIG. 2B is implementing the so-called feed injection type as also described in the aforementioned US2017343520A1. The modulation valve 270, in the second position, is configured for coupling the sampling unit 260 to the second coupling point 230 (within the second fluid processing unit 208) in order to eject—as a respective injection event-a fluid content buffered in the second buffering unit 265 into the second fluid processing unit 208 by combining a flow from the second buffering unit 265 with a flow within the second fluid processing unit 208 (as the flow of mobile phase driven by the second-dimension pumping unit 20').

Each injection event can be controlled in particular with respect to one or more of: the injected total fluid volume, the injected volume of sample effluent from the first fluid processing unit 204, a degree of dilution of sample effluent, a timing of such injection e.g. with respect to a mechanical configuration within the second fluid processing unit 208, a length (i.e. period of time) for executing such injection, et cetera. Preferably, control of each respective injection event is done by controlling operation of the modulation drive 267, either alone or in combination with controlling operation of the second-dimension pumping unit 20' (e.g. adjusting the flow rate of the mobile phase driven by the second-dimension pumping unit 20').

In the embodiment of FIG. 2, during each injection event the respective front portion contained in the second buffering unit 265, i.e. the fluid portion physically located the closest towards the central port 272, can be injected into the second fluid processing unit 208. Any fluid content (or portion thereof) remaining in the second buffering unit 265 after a previous injection event may then represent a respective front portion for a successive injection event. As the second buffering unit 265 contains the sample effluent from the first fluid processing unit 204 in consecutive order, operating the modulation drive 267 in the direction as indicated by the arrow in FIG. 2B (i.e. in opposite direction with respect to the first state "withdrawal" as depicted in FIG. 2A) can ensure processing of the injection events (in the second fluid processing unit 208) also in consecutive order.

In certain embodiments, it may be advantageous to eject a greater amount of fluid (into the second coupling point 230) than what has been drawn from the first coupling point 220. This can ensure that there are no residuals of a previous injection fluid in the paths and conduits in the system 90. To enable this type of operation it is advantageous to enable the modulation drive 267 to receive additional amount of fluid e.g. in a way such that no sampled fluid is moved through the second buffering unit 265 towards the modulation drive 267 during such fluid receival. This can be implemented, e.g., by one or more of the following:

switching the valve 270 to the third peripheral port 278 or other position connected to a fluid source (e.g. the auxiliary fluid source 280) and intaking an amount of fluid by the modulation drive 267 prior to a sample draw operation. Then the intaken amount can be ejected (injected) on top of the sample, thus "cleaning" the path from the second buffering unit 265 to the third coupling point 230;

switching the valve 270 to the peripheral port 276 prior to a draw operation (or keeping the valve 270 in the peripheral port 276 after an injection) and drawing an amount of the 2D-eluent provided by the second pumping unit 20', whereas the second pumping unit 20' will preferably increase the provided flow in order not to influence the flow driven into second-dimension chromatographic column 30';

providing an additional fluid drive, permanently or temporarily connectable to the modulation drive 267 upstream of the second buffering unit 265, e.g. immediately to the fluidic chamber of the modulation drive 267, e.g. via a check valve, such that the fluidic drive 267 can provide the additional amount of fluid;

implementing the modulation drive 267 as a dual-piston or a stepped-piston drive, connectable to a fluid source and comprising a valve, e.g. a check valve, such that during an intake operation the modulation drive 267 intakes from the second buffering unit 265, and the additional piston chamber or piston-step chamber intakes from an external fluid source, whereas during eject an ejection operation both chambers provide the flow towards the second buffering unit 265.

During the state of "injection" as depicted in FIG. 2B, the flow of mask fluid as provided by the mask flow source 250 is preferably stopped, and any effluent from the first fluid processing unit 204 can be buffered in the first buffering unit 240. Thus, a plug of mask solvent can be provided downstream of the buffered effluent amount, whereas no buffered effluent is removed from the third coupling point 252, thus enabling the next draw operation of non-disrupted amount of effluent, which may be particularly beneficial for comprehensive operation.

The second-dimension pumping unit 20' can be operated after each injection event to accelerate for a short time. Alternatively or in addition, the modulation drive 267 can be operated to draw in a portion of the eluent (mobile phase) provided by the second-dimension pump 20' as a "buffering zone" for a next injection (in order to guarantee complete expulsion of the sample amount including dispersion-based broadening).

Once injection of sample content (as buffered within the second buffering unit 265) into the second fluid processing unit 208 has been accomplished, preferably after the second buffering unit 265 has been completely emptied of any sample content buffered therein, the modulation valve 270 may be operated in (or switched into) the first state "withdrawal" either directly or via the third state "pressuring" (for reducing pressure in the sampling unit 210 to adjust to the pressure conditions at the first coupling point 220).

Selective sampling can also be achieved during the first state "withdrawal" of the modulation valve 270 by operating the modulation drive 267 to withdraw fluid from the first coupling point 220 and then stopping the modulation drive 267, which sequence may be repeated several times, so that eventually the second buffering unit 265 will contain one or more effluent contents spaced apart from each other. This may be useful e.g. for providing a so-called "multi heart-cutting" in order to transfer only selected portions of the effluent from the first fluid processing unit 204 to the second fluid processing unit 208 (for example only certain identified peaks).

For selective sampling operation, it may be particularly advantageous to set the draw flow rate somewhat higher than the flow provided by first-dimension pump 20 and to keep the mask flow switched on during the entire draw operation or at least in the beginning thereof. This may facilitate, on one hand, complete transfer of the effluent into the second buffering unit 265 and, on the other hand, provide a "clean" cut-off at the start of the effluent plug, because no effluent contained downstream of the third coupling point 252 at the moment of the beginning of draw operation will be transferred towards the first coupling point 220.

Figure 3:
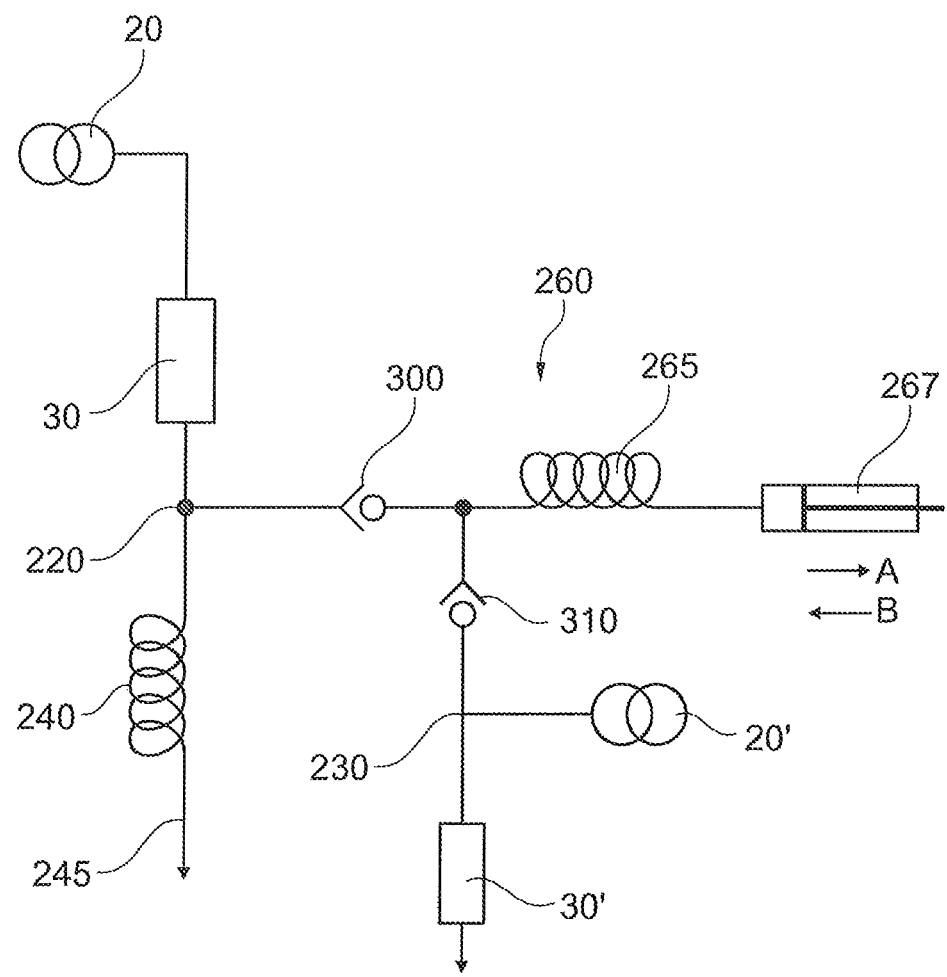
FIG. 3 shows an alternative embodiment of the modulation unit 260.

FIG. 3 shows an alternative embodiment of the modulation unit 260, wherein the (active) modulation valve 270 of FIG. 2 is replaced by a (passive) check valve assembly comprised of a first check valve 300 and a second check valve 310. In other words, the aforedescribed function of the active modulation valve 270 is accomplished by a (passive) check valve assembly comprised of a first check valve 300 and a second check valve 310. When the modulation drive 267 is moving in direction A (corresponding to the first phase "withdrawal" as illustrated in FIG. 2A) the first check valve 300 is opening and allowing to withdraw fluid from the first coupling point 220, while the second check valve 310 is closed (thus disabling any fluid transfer from the second coupling point 230). When the modulation drive 267 is moving in direction B (corresponding to the second phase "injection" as illustrated in FIG. 2B) the first check valve 300 is closed (thus disabling any fluid transfer from the first coupling point 220), while the second check valve 310 is opening and allowing injection of fluid stored in the second buffering unit 265 into the second coupling point 230.

It is noted that in the embodiment of FIG. 3 the pressure at the second coupling point 230 is typically higher than the pressure at the first coupling point 210, because the second coupling point 230 is located upstream of the column 30' while the first coupling point 220 is located downstream of the column 30 and is actually connected to the fluidic point 245 (e.g. an unpressurized waste port) via a low-resistance channel of the first buffering unit 240. Accordingly, a safe opening and closing of the check valves 300 and 310, as described above, can be assumed. Otherwise, additional adequate measures can be taken to assure the desired operation of the check valves 300 and 310.

Figure 4A:
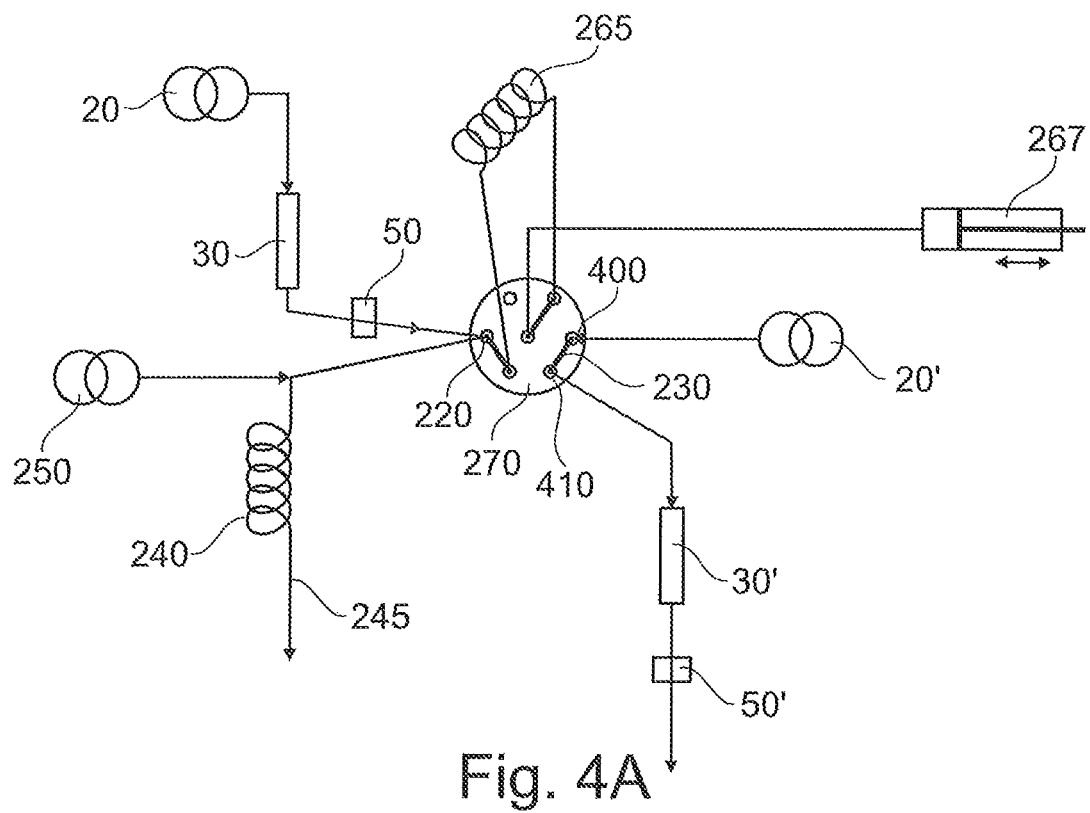
FIG. 4A is a schematic view of an example of a fluid processing apparatus according to an embodiment that implements flow-through injection, with a modulation unit thereof in a first position.
Figure 4B:
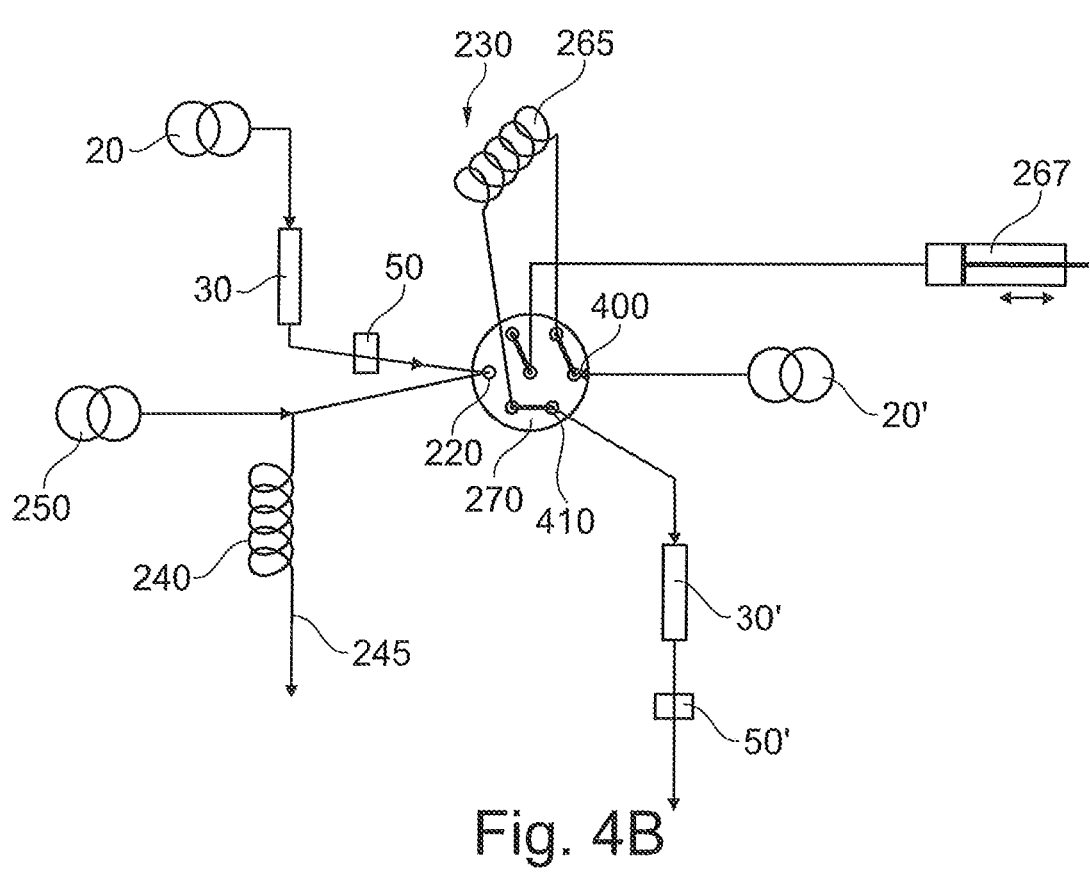
FIG. 4B is a schematic view of the fluid processing apparatus illustrated in FIG. 4A, with the modulation unit in a second position.

FIGS. 4A and 4B show an alternative embodiment implementing the so-called flow-through injection type, e.g. as disclosed in the aforementioned US20160334031A1. The second buffering loop 265 is implemented to be switchable into the flow path of the second fluid processing unit 208.

FIG. 4A shows the first position, corresponding in function to FIG. 2A, for loading the second buffering loop 265. The second buffering loop 265 is coupling to the first coupling point 220, allowing the modulation drive 267 to load the second buffering loop 265 with the effluent from the first fluid processing unit 204 e.g. as afore described.

FIG. 4B shows the second position, corresponding in function to FIG. 2B, for injecting the sample content buffered by the second buffering loop 265 into the flow path between the second pump 20' and the second separating unit 30'. The second buffering loop 265 is switched between the second pump 20' and the second separating unit 30', so that any fluid content previously received by the second buffering unit 265 will be injected into the flow path of the second fluid processing unit 208.

In the embodiment of FIG. 4A, the second coupling point 230 is implemented to be within the modulation valve 270, and may be implemented, as indicated in the schematics of FIG. 4 as a valve groove switchable between a port 400 to which the second pump 20' is coupling and another port 410 to which the second separating unit 30' is coupled. In the embodiment of FIG. 4B, the second coupling point 230 is represented and provided by the fluidic connection between the ports 400 and 410, e.g. the second buffering loop 265 and any fluidic conduit coupled to the respective ports 400 and 410 and may also include one or more valve grooves (e.g. the two grooves in the exemplary embodiment shown in FIG. 4B).

Figure 5A:
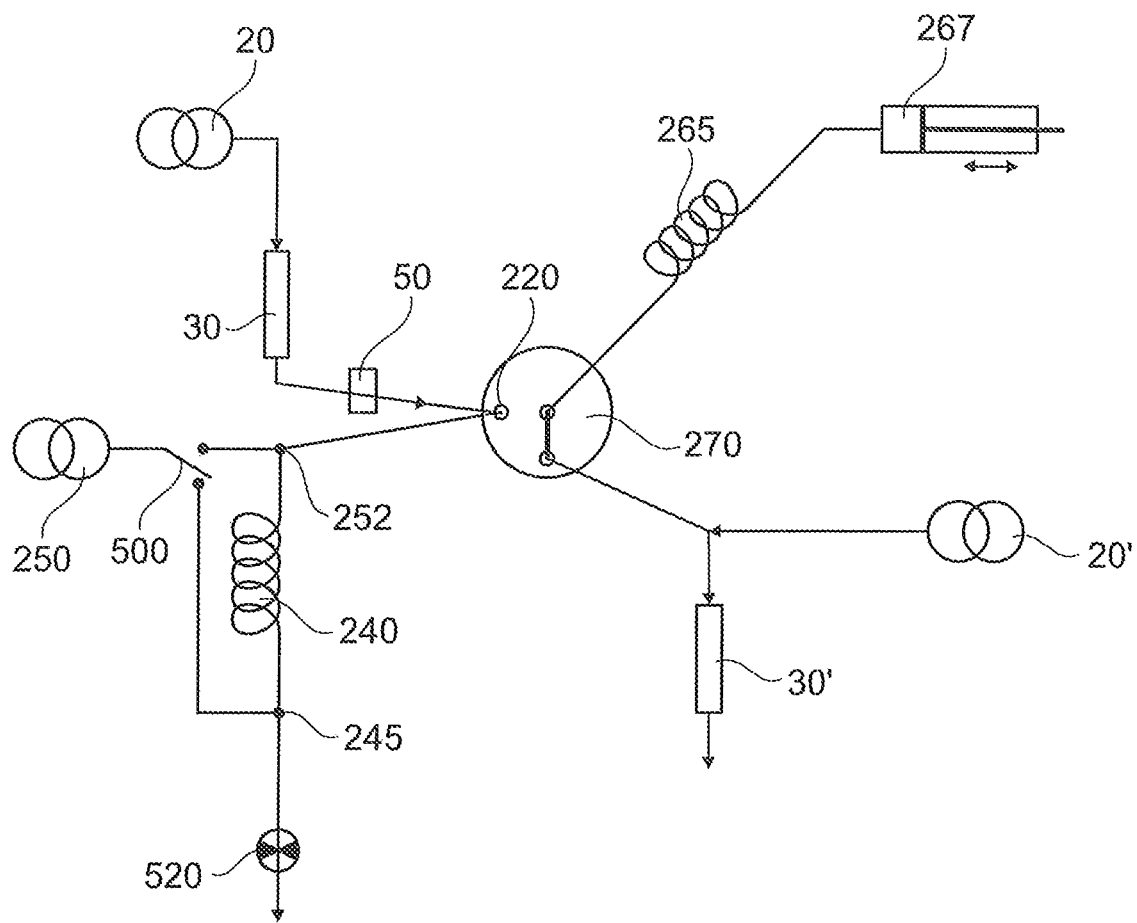
FIG. 5A is a schematic view of an example of a fluid processing apparatus according to another embodiment.
Figure 5B:
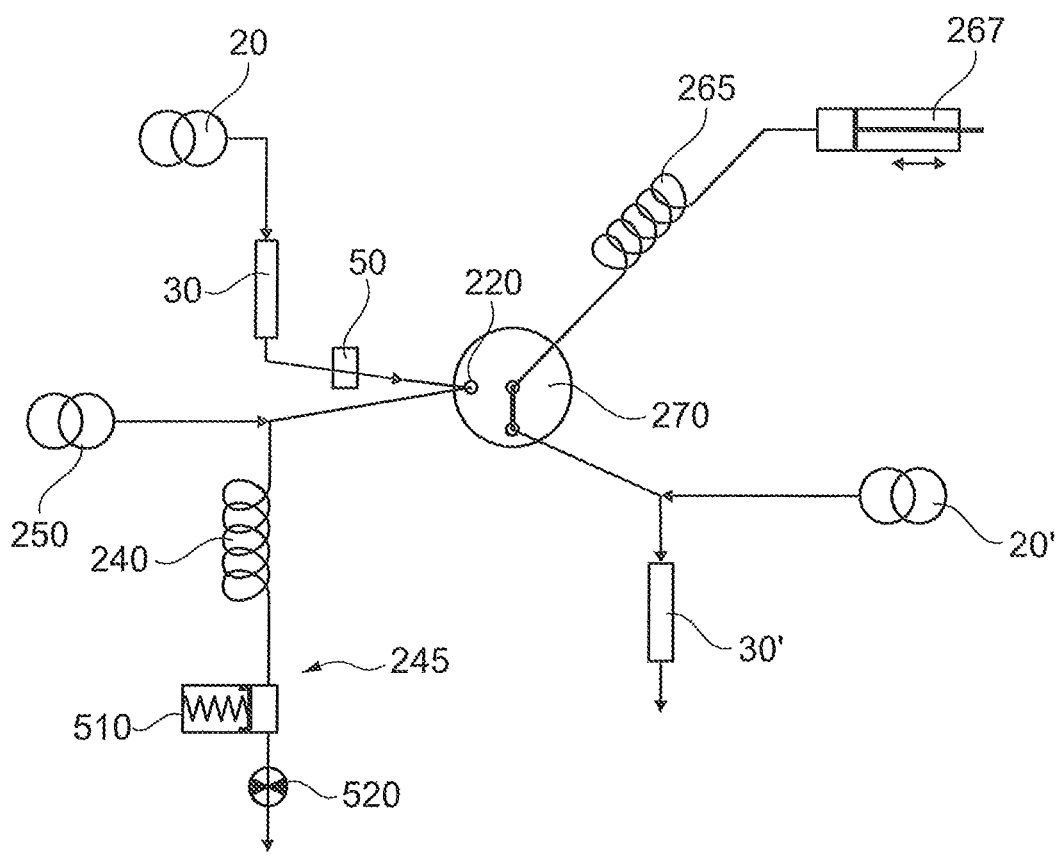
FIG. 5B is a schematic view of an example of a fluid processing apparatus according to another embodiment.
Figure 5C:
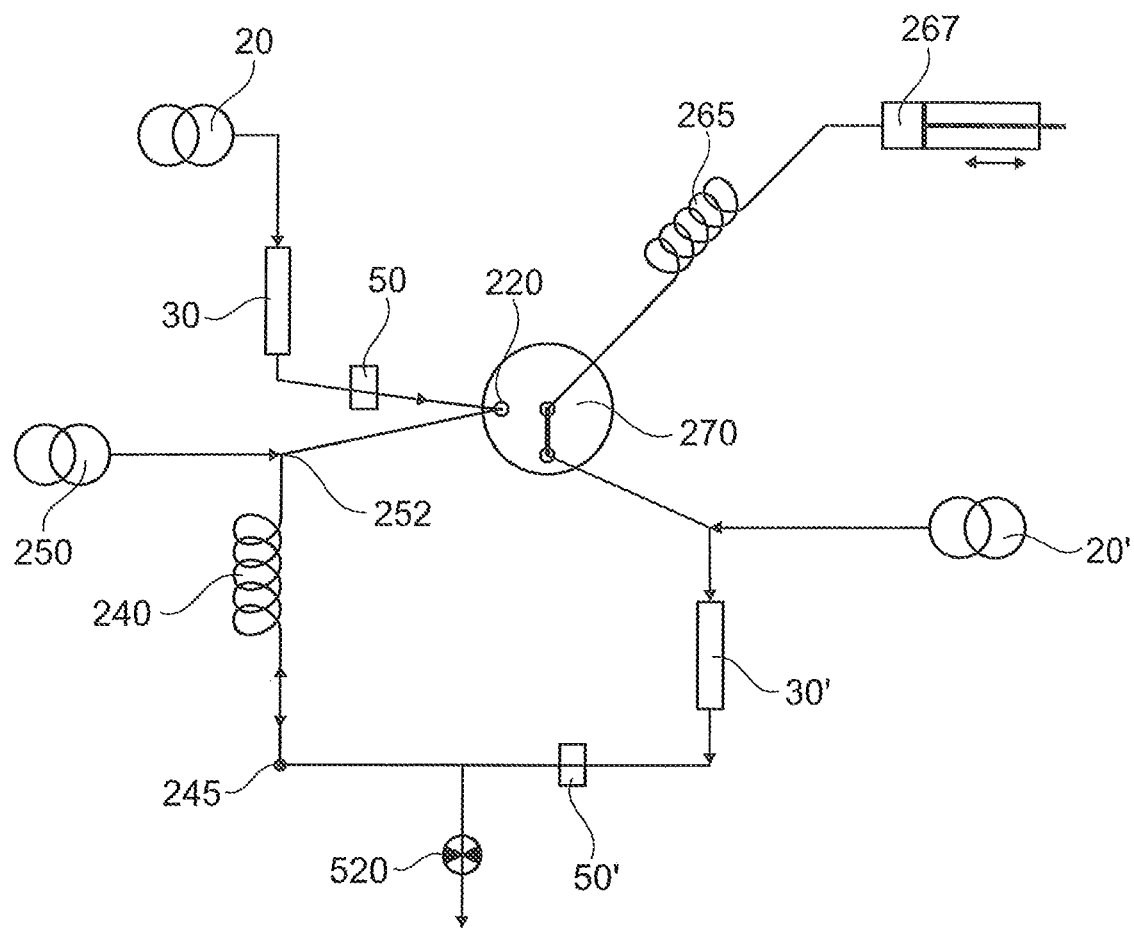
FIG. 5C is a schematic view of an example of a fluid processing apparatus according to another embodiment.

FIGS. 5A-5C illustrate further embodiments wherein the fluidic point 245 is provided as a pressure source in order to assist a fluid flow from the first buffering unit 240 towards the first coupling point 220, e.g. for loading the second buffering unit 265 with fluid content buffered in the first buffering unit 240. Such assisting pressure source allows pushing the fluid from the first buffering unit 240 (to the first coupling point 220) rather than (only) pulling such fluid from the first buffering unit 240 by the modulation drive 267, thus e.g. allowing to increase (e.g. over the extent provided by ambient atmospheric pressure) the driving force and speed of the fluid content from the first buffering unit 240 into the second buffering unit 265.

In the embodiment of FIG. 5A, a switch 500 is provided allowing to switch the mask flow source 250 to couple to the fluidic point 245 (instead of coupling to the third coupling point 252), thus allowing a mask flow from the mask flow source 250 through the first buffering unit 240 towards the third coupling point 252. The switching functionality schematically shown by the switch 500 may also be implemented by a valve, and it may even be implemented as part of the modulation valve 270.

In the embodiment of FIG. 5B, a damper 510 (which may be an elastic fluidic element) is provided as the fluidic point 245 and acts as a pressure and/or flow source. The damper 510 may be pumped up e.g. by the mask flow source 250.

In the embodiment of FIG. 5C, an outlet (e.g. an outlet of the detector 50' as shown in the exemplary embodiment of FIG. 5C) of the second fluid processing unit 208 is fluidically coupled to the fluidic point 245. Thus, the flow for pushing the fluid content from the first buffering unit 240 is branched off from the effluent of the second fluid processing unit 208. In a two-dimensional chromatographic apparatus, this can be possible because the second dimension (the second fluid processing unit 208) is usually working during the time when the first dimension (the first fluid processing unit 204) is active, and the flow in the second dimension is typically high enough to provide the desired branch off flow.

Instead of the embodiments shown in FIG. 5, a dedicated pump or other pressure source may be provided as or coupling to the fluidic point 245, however such additional components are typically less cost-efficient.

In all embodiments of FIGS. 5A-5C, an optional back pressure regulator 520 (which may be implemented as a restrictor) may be used downstream to the fluidic point 245 (i.e. the fluidic point 245 may be coupled between the first buffering unit 240 and the back-pressure regulator 520). In the exemplary embodiments of FIG. 5, the back-pressure regulator 520 may be further coupled to waste (or any other fluidic unit as appropriate).

It is to be understood that—in all embodiments—the second buffering unit 265 may comprise a plurality of buffering units, e.g. a plurality of sample loops, which may be selectively switchable to or into the fluidic path e.g. by means of the modulation valve 270, as e.g. disclosed in WO2016016740A1 by the same applicant). Accordingly or in addition, the modulation unit 210 may be comprised of a plurality of modulation drives, preferably each coupling to a respective second buffering unit.

The modulation drive 267 in the shown Figures is, for the sake of simplicity and explanation, embodied as a syringe-type pumping unit, i.e. a syringe allowing in one mode of operation ("withdrawing" as depicted in FIG. 2A) to withdraw fluid from the first coupling point 220 and in another mode of operation ("injection" as depicted in FIG. 2B) to inject fluid into the second coupling point 230. Preferably, such syringe-type pump is implemented with a low dead volume (and preferably zero dead volume). Several other embodiments are possible for implementing such modes of operation of the modulation drive 267, such as a simple modulation syringe as depicted in FIG. 2 or any other type of pumping apparatus, such as reciprocating pumps or pumping units, e.g. comprising one or more one-stage, two-stage, or plural-stage step-piston pumps.

It is also to be understood that the described set-up and method are suitable for combining liquid chromatography (LC) and supercritical fluid chromatography (SFC) in different (chromatographic) dimensions. Whereas coupling LC-SFC is straightforward in the described setup, coupling SFC-LC requires a backpressure regulator or generator at the outlet of the first buffering unit 240. In order to force the effluent transfer from first buffering unit 240 to the modulation drive 267, the mask flow unit 250 can be connected permanently downstream of the first buffering unit 240 or can be switchably connected to either the inlet or the outlet of the first buffering unit 240.

Further it is understood, that the depicted valve 270 shows only schematically the function of switching the modulation drive 267 between the first and the second dimension 204 and 208, and that the modulation valve 270 can carry further functions, as switching the mask flow pump alternatively before or after the first buffer loop 240, switching a fluidic connection to a different or further location in the modulation drive 267 or modulation path 260, e.g. for flushing the modulation syringe 267 etc. It is also understood that the modulation valve 270 can be embodied in different ways, e.g. as a rotary, translatory valve, microfluidic valve, plurality of ball valves, needle valves and more.

It should be noted that the term "comprising" does not exclude other elements or features and the term "a" or "an" does not exclude a plurality. Also, elements described in association with different embodiments may be combined. It should also be noted that reference signs in the claims shall not be construed as limiting the scope of the claims.

The invention claimed is:

1. A fluid processing apparatus comprising:
   a first fluid processing unit and a second fluid processing unit, each configured for processing fluid;
   a fluid unit fluidically coupled to the first fluid processing unit and comprising one of:
      a first buffering unit configured for buffering fluid; and
      a first buffering unit configured for buffering fluid, and a mask flow source configured for providing a mask fluid or a flow thereof;
   a first coupling point fluidically coupled between the first fluid processing unit and the fluid unit; and
   a modulation unit configured, selectively, for withdrawing fluid from the first coupling point, or for transferring withdrawn fluid into the second fluid processing unit,
   wherein the modulation unit comprises: a sampling unit comprising a second buffering unit and a modulation drive, wherein the modulation drive is configured for withdrawing fluid into the second buffering unit and for ejecting fluid buffered in the second buffering unit; and a modulation valve configured, in a first position, for coupling the sampling unit to the first coupling point and, in a second position, for coupling the sampling unit to the second fluid processing unit,
   wherein the modulation unit is configured such that during the withdrawing of the fluid and the transferring of the withdrawn fluid, the first coupling point remains fluidically coupled between the first fluid processing unit and the fluid unit.

2. The fluid processing apparatus according to claim 1, comprising one of:
   the modulation valve is configured, in a third position, to enable pressurizing or depressurizing a fluid content within the second buffering unit by acting of the modulation drive; and the modulation valve is configured, in a third position, to enable pressurizing or depressurizing a fluid content within the second buffering unit by acting of the modulation drive, in that the modulation valve fluidically blocks one end of the second buffering unit while the modulation drive is coupled to and acting on an opposite end of the second buffering unit.

3. The fluid processing apparatus according to claim 1, comprising at least one of:
the modulation valve, in the second position, is configured for coupling the sampling unit to a second coupling point within the second fluid processing unit in order to eject a fluid content buffered in the second buffering unit into the second fluid processing unit by combining a flow from the second buffering unit with a flow within the second fluid processing unit; and
the modulation valve, in the second position, is configured for switching a sample loop containing a fluid content, previously received from the second buffering unit, into a flow path within the second fluid processing unit in order to inject the fluid content into the second fluid processing unit.

4. The fluid processing apparatus according to claim 1, wherein:
the fluid unit comprises the mask flow source;
the mask flow source is fluidically coupling to a third coupling point; and
the third coupling point is located at the first coupling point or between the first coupling point and the first buffering unit.

5. The fluid processing apparatus according to claim 4, comprising at least one of:
the mask flow source comprises a mask flow pump configured for driving the mask fluid;
the mask flow source comprises a first reservoir of the mask fluid;
the mask fluid is a solvent or a solvent mixture; and
the mask fluid is a chromatographically weaker solvent than an initial gradient solvent in the second fluid processing unit, and is configured for chromatographically eluting a sample from a chromatographic column more slowly than the initial gradient solvent.

6. The fluid processing apparatus according to claim 1, further comprising:
an auxiliary fluid source fluidically coupling to the modulation unit and configured for providing a flow of an auxiliary fluid.

7. The fluid processing apparatus according to claim 6, comprising at least one of:
the auxiliary fluid source comprises auxiliary fluidic pump configured for driving the auxiliary fluid;
the auxiliary fluid source comprises a second reservoir of the auxiliary fluid;
the auxiliary fluid is a solvent or a solvent mixture; and
the auxiliary fluid is a chromatographically weaker solvent than an initial gradient solvent in the second fluid processing unit, and is configured for chromatographically eluting a sample from a chromatographic column more slowly than the initial gradient solvent.

8. The fluid processing apparatus according to claim 1, further comprising:
a pressure source coupled to the first buffering unit and configured to assist fluid flow from the first buffering unit to the modulation unit.

9. The fluid processing apparatus according to claim 1, comprising at least one of:

the first fluid processing unit and the second fluid processing unit are fluidically decoupled from each other, so that a transfer of fluid from the first fluid processing unit to the second fluid processing unit can occur only via active modulation by the modulation unit;
the first fluid processing unit comprises a first flow path, and the second fluid processing unit comprises a second flow path, wherein the first flow path and the second flow path are fluidically decoupled from each other, so that there is no passive flow path connection between the first flow path and the second flow path at any time, and a transfer of fluid from the first flow path to the second flow path can occur only via active modulation by the modulation unit;
the modulation unit is configured for withdrawing from the first coupling point at least such amount of fluid as received from the first fluid processing unit; and
a first-dimension fluid drive configured for generating a fluid flow for driving the fluidic sample to be separated through the first fluid processing unit.

10. The fluid processing apparatus according to claim 1, comprising at least one of:
the apparatus is a fluid separation apparatus configured for separating a fluidic sample;
the first fluid processing unit is a first fluid separation apparatus configured for separating a fluidic sample in a first dimension, and the second fluid processing unit is a second fluid separation apparatus configured for separating a fluid sample in a second dimension, wherein the fluidic sample is transferred from the first separation apparatus;
the first coupling point is located downstream of an outlet of the first fluid processing unit;
the first buffering unit is fluidically coupled to an outlet of the first fluid processing unit;
the first buffering unit comprises at least one of: a sample loop, a sample volume, a trap volume, a trap column, a fluid reservoir, a capillary, a tube, a microfluidic channel structure;
the modulation unit is configured for withdrawing fluid from an outlet of the first fluid processing unit; and
the modulation unit is configured for ejecting withdrawn fluid into a second coupling point within the second fluid processing unit.

11. The fluid processing apparatus according to claim 1, comprising a control unit configured to control:
withdrawing fluid from the first coupling point; and
transferring withdrawn fluid into the second fluid processing unit.

12. The fluid processing apparatus according to claim 11, comprising at least one of:
the control unit is configured to control an amount of fluid being withdrawn from the first buffering unit;
the control unit is configured to control the modulation unit to withdraw during a respective withdraw time interval an amount of fluid from the first coupling point to be larger than an amount of fluid output from the first fluid processing unit during the withdraw time interval;
the control unit is configured to control an amount of fluid being withdrawn during a withdraw time interval from the first coupling point;
the control unit is configured to control an amount of the withdrawn fluid being transferred into the second fluid processing unit; and
the control unit is configured to control a flow or pressure generated by a fluidic drive of the second fluid processing unit.

13. A method for processing fluid, comprising:

processing fluid in a first fluid processing unit;

fluidically coupling a fluid unit to the first fluid processing unit, wherein the fluid unit is configured for at least one of:

buffering fluid received from the first fluid processing unit in a first buffering unit; and buffering fluid received from the first fluid processing unit in a first buffering unit, and providing a mask fluid or a flow thereof;

withdrawing fluid from a first coupling point fluidically coupled between the first fluid processing unit and the fluid unit; and transferring withdrawn fluid into a second fluid processing unit, wherein the withdrawing of the fluid and the transferring of the withdrawn fluid are performed selectively by a modulation unit, wherein the modulation unit comprises: a sampling unit comprising a second buffering unit and a modulation drive, wherein the modulation drive is configured for withdrawing fluid into the second buffering unit and for ejecting fluid buffered in the second buffering unit; and a modulation valve configured, in a first position, for coupling the sampling unit to the first coupling point and, in a second position, for coupling the sampling unit to the second fluid processing unit, wherein the modulation unit is configured such that during the withdrawing of the fluid and the transferring of the withdrawn fluid, the first coupling point remains fluidically coupled between the first fluid processing unit and the fluid unit.

14. The method according to claim 13, comprising:

pressurizing or depressurizing the withdrawn fluid before transferring withdrawn fluid into the second fluid processing unit.

15. The method according to claim 13, comprising at least one of:

coupling to a second coupling point within the second fluid processing unit in order to eject a fluid content into the second fluid processing unit by combining with a flow within the second fluid processing unit; and switching a sample loop containing a fluid content into a flow path within the second fluid processing unit in order to inject the fluid content into the second fluid processing unit.

16. The method according to claim 13, further comprising at least one of:

providing the flow of the mask fluid to at least one of the first coupling point and a second coupling point within the second fluid processing unit in order to dilute the withdrawn fluid; and providing the flow of the mask fluid into the first buffering unit.

17. The method according to claim 13, comprising at least one of:

processing fluid in the first fluid processing unit comprises separating a fluidic sample in a first dimension;

processing fluid in the second fluid processing unit by separating a transferred fluid sample content in a second dimension;

the first coupling point is located downstream of an outlet of the first fluid processing unit;

withdrawing fluid comprises withdrawing a desired or calculated amount of the fluid from the first buffering unit along with the fluid supplied from the first fluid processing unit via the first coupling point by means of the modulation unit;

withdrawing fluid comprises withdrawing fluid from the first fluid processing unit via the first coupling point; and transferring withdrawn fluid comprises ejecting withdrawn fluid into the second fluid processing unit.

18. A non-transitory computer-readable medium with instructions stored thereon, that when executed by a processor, control the steps of the method of claim 13.

* * * * *